(12) United States Patent
Yokoyama

(10) Patent No.: US 8,704,731 B2
(45) Date of Patent: Apr. 22, 2014

(54) DISPLAY CONTROL DEVICE, DISPLAY CONTROL METHOD, CONTROL PROGRAM, AND STORAGE MEDIUM

(75) Inventor: Yoshihisa Yokoyama, Osaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 362 days.

(21) Appl. No.: 13/089,611

(22) Filed: Apr. 19, 2011

(65) Prior Publication Data

US 2011/0254876 A1    Oct. 20, 2011

(30) Foreign Application Priority Data

Apr. 20, 2010 (JP) ................................ 2010-097194

(51) Int. Cl.
*G09G 5/00* (2006.01)

(52) U.S. Cl.
USPC .......................................... 345/1.1; 345/690

(58) Field of Classification Search
USPC .......... 345/77–102, 204–214, 690; 315/169.3
See application file for complete search history.

(56) References Cited

U.S. PATENT DOCUMENTS

| | | | |
|---|---|---|---|
| 2001/0013843 A1 | 8/2001 | Fujiwara et al. | |
| 2002/0075288 A1* | 6/2002 | Matsumura et al. | 345/690 |
| 2004/0217918 A1 | 11/2004 | Ando et al. | |
| 2005/0134194 A1* | 6/2005 | Murata | 315/221 |
| 2005/0219467 A1 | 10/2005 | Nomizo et al. | |
| 2007/0222738 A1* | 9/2007 | Yoshida | 345/101 |
| 2010/0141669 A1* | 6/2010 | Sadahiro | 345/589 |
| 2010/0201716 A1* | 8/2010 | Tanizoe et al. | 345/690 |
| 2011/0181565 A1* | 7/2011 | Asamura et al. | 345/207 |

FOREIGN PATENT DOCUMENTS

| | | |
|---|---|---|
| JP | 10-090645 A | 4/1998 |
| JP | 11-2801 | 1/1999 |
| JP | 2000-163007 | 6/2000 |
| JP | 2000-194337 | 7/2000 |
| JP | 2000-338941 A | 12/2000 |
| JP | 2003-167566 | 6/2003 |
| JP | 2004-226513 | 8/2004 |
| JP | 2005-241806 A | 9/2005 |
| JP | 2005-274816 A | 10/2005 |
| JP | 2007-065098 A | 3/2007 |
| JP | 2009-122494 | 6/2009 |
| JP | 2009-216808 A | 9/2009 |
| JP | 2009-216809 A | 9/2009 |

* cited by examiner

*Primary Examiner* — William Boddie
*Assistant Examiner* — Mansour M Said
(74) *Attorney, Agent, or Firm* — Nixon & Vanderhye P.C.

(57) ABSTRACT

A display control device of this invention controls a plurality of display devices included in a multi display system, including: a status obtaining section for obtaining, from the plurality of display devices, luminance setting values of the respective plurality of display devices, the luminance setting values defining luminance levels of the respective plurality of display devices; and a luminance control section for (i) determining a standard luminance setting value according to the luminance setting values obtained from the plurality of display devices and (ii) changing each of the luminance setting values of the respective display devices to the standard luminance setting value.

9 Claims, 13 Drawing Sheets

DISPLAY CONTROL DEVICE, DISPLAY CONTROL METHOD, CONTROL PROGRAM, AND STORAGE MEDIUM

This Nonprovisional application claims priority under 35 U.S.C. §119(a) on Patent Application No. 2010-097194 filed in Japan on Apr. 20, 2010, the entire contents of which are hereby incorporated by reference.

TECHNICAL FIELD

The present invention relates to: a display control device for controlling a plurality of display devices included in a multi display system; and a method thereof.

BACKGROUND ART

There are various kinds of components (e.g., a light-emitting element, a liquid crystal element, and other various electronic components) for use in display devices such as an electroluminescence (EL) display, a plasma display panel (PDP), a light-emitting diode (LED) display device, and a liquid crystal display (LCD), and each of such the components has a temperature range in which the component can operate normally. If the temperature of the component exceeds a predetermined value or drops below a predetermined value due to an effect of an outside temperature, an ambient temperature of the component, and/or heat generated by the component itself, the display device might not operate normally; for example, the display device cannot maintain a favorable display condition, or has a trouble in its internal structure.

In order to deal with such the problems, there have been conventional techniques for adjusting a luminance level of a display device according to outside and/or internal temperatures of the display device (Literatures 1 through 4).

As one example of such the techniques, there is a technique for adjusting a luminance level of a display device for the purpose of (i) preventing a case (hereinafter, referred to as "temperature abnormality") where a temperature of the display device becomes out of a temperature range in which the display device can operate normally or (ii) causing, if a temperature abnormality occurs, the temperature of the display device to be within the appropriate temperature range.

Typically, the higher the luminance level of a display device becomes, the more electric power the display device consumes. Consequently, the display device generates a larger amount of heat. In order to deal with this, for example, each of the techniques described in Literatures 1 through 3 causes, for the purpose of lowering an internal temperature of a display device, a control section (or a display driving section) for adjusting a luminance level of a light-emitting element to reduce the luminance level of the light-emitting element so as to suppress an increase in an amount of heat generation.

Meanwhile, Literature 4 focuses on temperature properties of liquid crystal. Specifically, Literature 4 discloses a technique for adjusting, according to an ambient temperature of a liquid crystal element (particularly, an outside air temperature), a luminance value which is to be supplied to a control section. This prevents display quality from being changed due to the outside air temperature, thereby maintaining a favorable display condition of an LCD independently of the environment of the LCD.

CITATION LIST

Literatures

[Literature 1]
Japanese Patent Application Publication, Tokukai, No. 2000-194337 A (Publication Date: Jul. 14, 2000)

[Literature 2]
Japanese Patent Application Publication, Tokukai, No. 2003-167566 A (Publication Date: Jun. 13, 2003)

[Literature 3]
Japanese Patent Application Publication, Tokukai, No. 2009-122494 A (Publication Date: Jun. 4, 2009)

[Literature 4]
Japanese Patent Application Publication, Tokukaihei, No. 11-2801 A (Publication. Date: Jan. 6, 1999)

Solution to Problem

However, if each of the techniques described in Literatures 1 through 4 is applied to a multi display system including a plurality of display devices, the following problems arise:

This will be described with a concrete example. For example, as shown in FIG. 13, a multi display system includes four display devices 300a through 300d, which are arranged in a 2×2 (horizontally and vertically) matrix. In this case, assume that a temperature change (or a temperature abnormality) occurs in one (e.g., the display device 300d, which is an upper left one) of the display devices 300a through 300d. Then, according to the above-described conventional techniques, as shown in FIG. 13, adjustment of a luminance level is carried out with respect to the display device 300d, in which the temperature change occurs. For example, in a case where a high temperature is detected in the display device 300d, the luminance level of the display device 300d would be reduced.

In such a case, as shown in FIG. 13, only a screen of the display device 300d, whose luminance level has been reduced, becomes darker than those of the other display devices 300a through 300c, in which no temperature change occurs. Thus, such a problem arises that, while the measure against the temperature change (temperature abnormality) is implemented, a variation occurs between the luminance levels of the display devices included in the multi display system, thereby impairing visibility of the entire multi display.

SUMMARY OF INVENTION

The present invention was made in view of the foregoing problems, and an object of the present invention is to provide: a display control device for carrying out, in a multi display system, a luminance control according to a change in the surroundings without impairing visibility of the multi display; a display control method thereof; a control program thereof; and a storage medium storing the control program.

In order to attain the foregoing object, a display control device of the present invention is a display control device for controlling a plurality of display devices included in a multi display system, including: a status obtaining section for obtaining, from the plurality of display devices, luminance setting values of the respective plurality of display devices, the luminance setting values defining luminance levels of the respective plurality of display devices; and a luminance control section for (i) determining a standard luminance setting value according to the luminance setting values obtained from the plurality of display devices and (ii) changing each of the luminance setting values of the respective display devices to the standard luminance setting value.

According to the above configuration, in the multi display system including the plurality of display devices, the status obtaining section of the display control device obtains, from the plurality of display devices, the luminance setting values of the respective display devices. Then, according to all the luminance setting values of the respective display devices collected by the status obtaining section, the luminance control section determines the standard luminance setting value. The luminance control section changes each of the luminance setting values of all the display device to the standard luminance setting value thus determined. Each of the display devices can control its luminance level according to the standard luminance setting value to which its luminance setting value is to be changed.

Thanks to this, even in a case where the display devices have luminance setting values having a variation therebetween, all of the luminance setting values can be set to the standard luminance setting value. This can prevent occurrence of a variation between the luminance levels of the display devices, thereby making it possible to carry out a luminance control according to a change in the surroundings without impairing visibility of the multi display.

In order to attain the foregoing object, a display control method of the present invention is a display control method for controlling a plurality of display devices included in a multi display system, including the steps of: (i) obtaining, from the plurality of display devices, luminance setting values of the respective plurality of display devices, the luminance setting values defining luminance levels of the respective plurality of display devices; and (ii) controlling the luminance levels in such a manner that a standard luminance setting value is determined according to the luminance setting values obtained from the plurality of display devices in the step (i), and each of the luminance setting values of the respective plurality of display devices is changed to the standard luminance setting value.

Note that the display control device may be realized by a computer. In this case, the present invention also encompasses (i) a control program of a display control device which control program causes a computer to operate as each of the above sections so as to realize the display control device by the computer and (ii) a computer-readable storage medium storing the control program.

Additional objects, features, and strengths of the present invention will be made clear by the description below. Further, the advantages of the present invention will be evident from the following explanation in reference to the drawings.

DESCRIPTION OF EMBODIMENTS

Embodiment 1

The following will describe one embodiment of the present invention with reference to FIGS. 1 through 9.

The one embodiment described below has, as one example, such a configuration in which a multi display system of the present invention is applied to a multi display system including four display devices. The "display device" of the present invention includes, for example, a display section made of a liquid crystal display (LCD). However, the present invention is not limited to this. Alternatively, in a multi display system of the present invention, a display device of the present invention may be made of an electroluminescence (EL) display, a plasma display panel (PDP), a light-emitting diode (LED) display device, or the like.

Further, the multi display system of the present invention includes a control device which centrally controls the display devices and is made of, e.g., a personal computer (PC). In the present embodiment, the control device also serves as a "display control device" of the present invention.

Note that the number and arrangement of display devices included in the multi display system of the present embodiment are employed as merely one example for concretely explaining the present invention, and do not have any intention to limit a configuration of a multi display system of the present invention.

(Configuration of Multi Display System)

Figure 2:
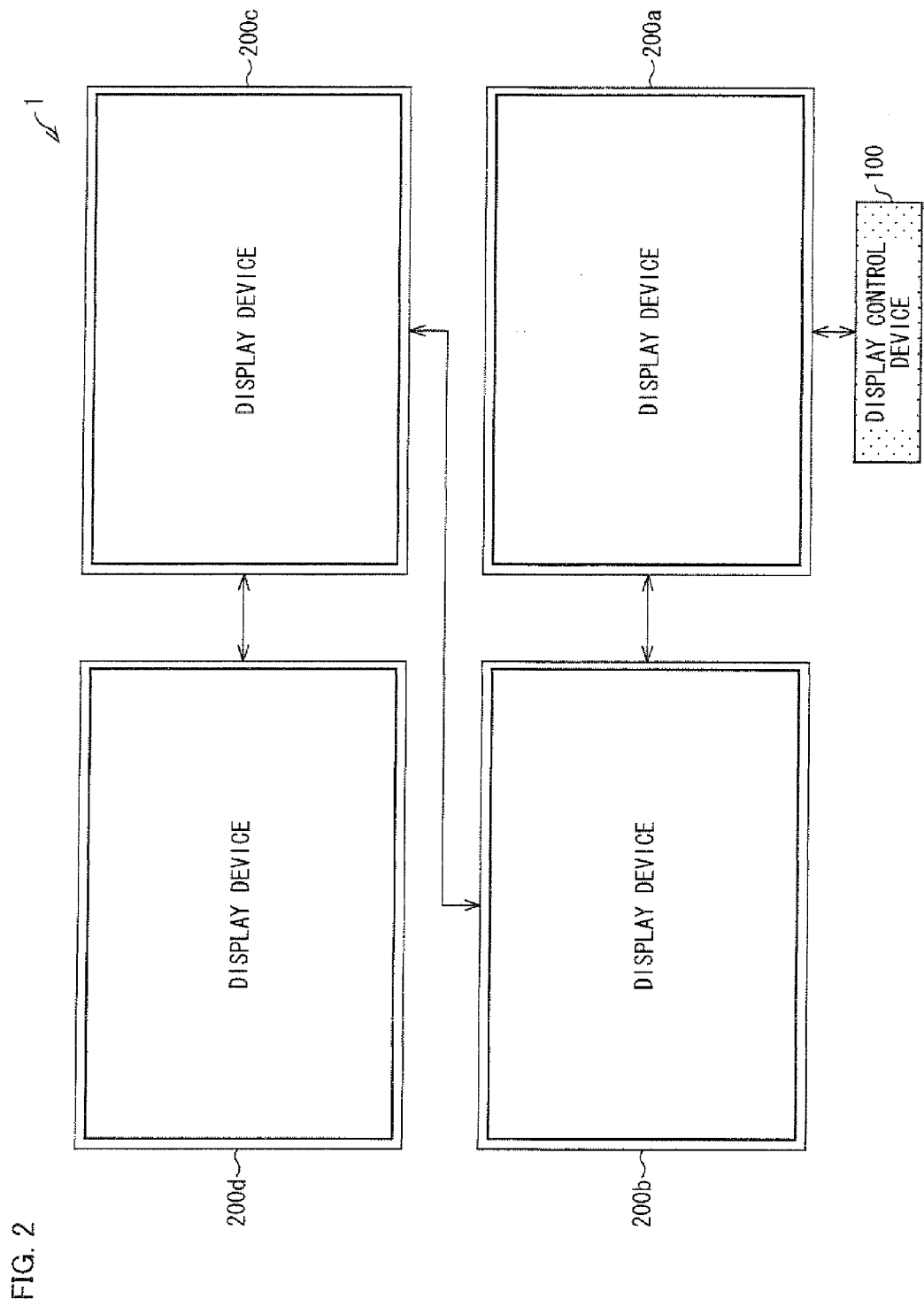
FIG. 2 is a view schematically illustrating a configuration of a multi display system according to the one embodiment of the present invention.

First, the following will schematically describe a multi display system of the present embodiment with reference to FIG. 2. FIG. 2 is a view schematically illustrating a configuration of the multi display system of the present embodiment.

As shown in FIG. 2, a multi display system 1 is configured to include (i) a total of four display devices 200_a_ through 200_d_ arranged in a 2×2 (horizontally and vertically) matrix and (ii) a control device such as a PC for centrally controlling these display devices. In the present embodiment, as described above, the control device serves as a display control device 100 of the present invention.

Note that an arrangement of display devices in a multi display system of the present invention is not limited to this. Alternatively, for example, the multi display system may be configured so as to include a plurality of display devices aligned horizontally.

In the present embodiment, as one example, the four display devices 200_a_ through 200_d_ are connected as follows: The display control device 100 (which is on the uppermost stream side), the display device 200a, the display device 200b, the display device 200c, and the display device 200d are connected in series in this order from the upstream side to the downstream side. In the present embodiment, the display control device 100, which is connected with the display device 200a, has not only (i) a function (hereinafter, referred to as a "image signal output function") for controlling display content which is to be displayed on the display devices 200a through 200d but also (ii) a function (hereinafter, referred to as a "luminance control function") for controlling luminance levels by monitoring temperatures of the respective display devices.

In order that the display control device 100 carries out the luminance control function, the devices transmit/receive a command and a response to the command. In order to enable the transmission/reception, the devices in the multi display system 1 can be connected with each other by any of various kinds of communication means, e.g., RS-232C, wired/wireless LAN (Local Area Network), HDMI (High Definition Multimedia Interface) CEC. Meanwhile, for the image signal output function, in order to transmit/receive an image signal to/from the devices, the devices may be connected with each other in a suitable mode as in conventional multi display systems. In a case where the display devices 200 are configured to also output an audio signal, the display devices 200 are connected with each other in a mode which allows the display devices 200 to transmit/receive an audio signal.

As described above, the devices are connected such that the display control device 100 which is provided on the uppermost stream side and the devices which are provided downstream of the display control device 100 are connected in series. Therefore, each display device 200 receives, via the communication means from a device which is provided upstream of the display device 200, a command outputted by the display control device 100; further, if the received command is for a device which is provided downstream of the display device 200, the display device 200 transmits the command to a device (also referred to as a "downstream device") which is directly connected with the display device 200 on its downstream side. Meanwhile, in order that the display device 200 transmits a response to the command to the display control device 100, the display device 200 transmits the response to a device (also referred to as an "upstream device") which is directly connected with the display device 200 on its upstream side. Also, in a case where the display device 200 receives a response from the downstream device, the display device 200 transmits the response to its upstream device. As a result, commands transmitted from the display control device 100 to the display devices 200 are received by all of the display devices 200. Further, responses from the display devices 200 to the commands are collected in the display control device 100.

Note that the connection mode of the devices shown in FIG. 2 is merely one example, and does not have any intention to limit a configuration of a multi display system of the present invention. The present invention also encompasses, for example, a connection mode in which the display control device 100 and the display devices 200 are connected with each other in parallel by use of a hub, so that the display control device 100 directly communicates with all of the display devices 200.

Figure 1:
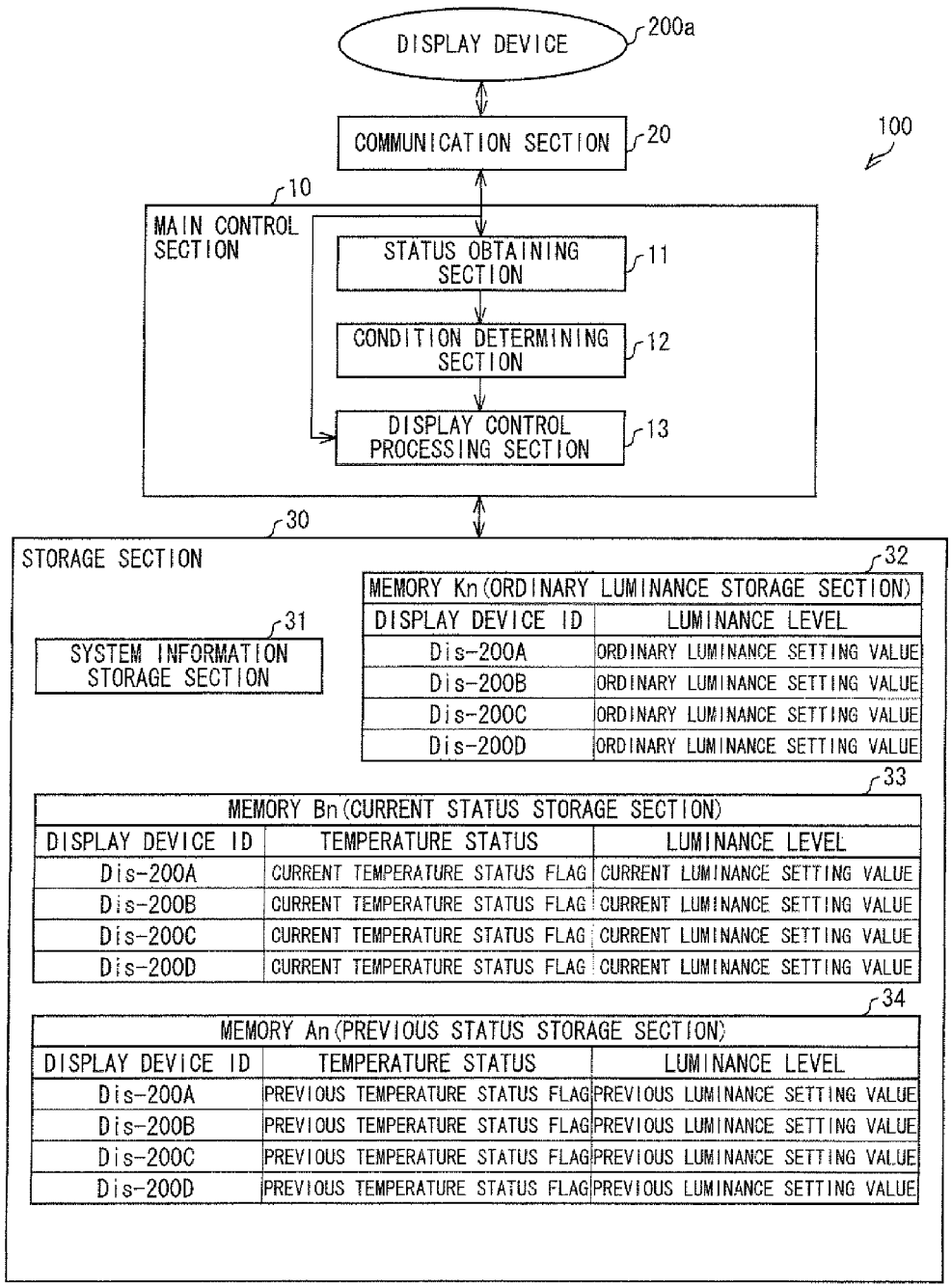
FIG. 1 is a block diagram illustrating a configuration of a main part of a display control device according to one embodiment of the present invention.
Figure 3:
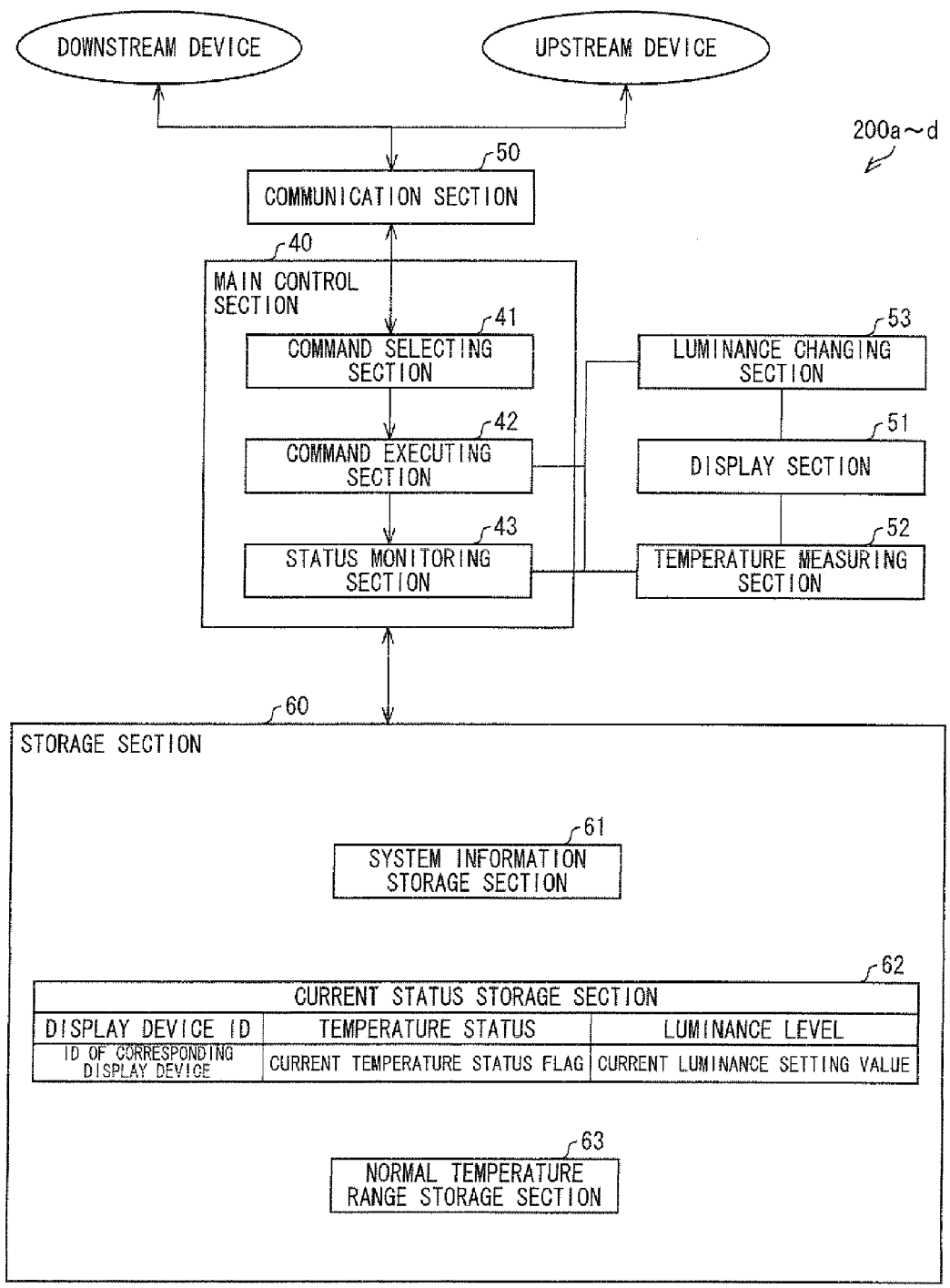
FIG. 3 is a block diagram illustrating a configuration of a main part of a display device according to the one embodiment of the present invention.

Next, the following will describe, with reference to FIGS. 1 and 3, configurations of the display control device 100 and the display device 200, each of which is included in the multi display system 1 of the present embodiment.

[Configuration of Display Control Device]

FIG. 1 is a block diagram illustrating a configuration of a main part of the display control device 100 according to the present embodiment. As shown in FIG. 1, the display control device 100 includes a main control section 10, a communication section 20, and a storage section 30.

The main control section 10 centrally controls the sections included in the display control device 100, and includes, as functional blocks, at least a status obtaining section 11 and a display control processing section 13. Further, the main control section 10 may include a condition determining section 12. Each of the above functional blocks of the main control section 10 can be achieved in such a manner that a CPU (central processing unit) retrieves a program stored in a storage device (not illustrated) made of, e.g., a ROM (read only memory), loads the program to a RAM (random access memory) or the like (not illustrated), and executes the program therein.

Consequently, the main control section 10 can generate commands for controlling the display devices 200 which belong to the display control device 100, and can execute the luminance control function with respect to the display devices 200. A function of each functional block of the main control section 10 will be described in detail later.

The communication section 20 communicates with the display devices 200 which belong to the display control device 100 (in the present embodiment, particularly, the display device 200a, which is directly connected to the display control device 100), so as to transmit/receive messages to/from the display devices 200, which are connected so as to constitute the multi display system 1. The communication section 20 transmits, to each display device 200, a command generated by the main control section 10, and receives a response message transmitted from the display device 200 in response to the command. As described above, the communication section 20 is realized by communication means such as RS-232C, wired LAN, wireless LAN, or HDMI.

The storage section 30 stores various kinds of data that the main control section 10 reads out when various kinds of functions of the display control device 100 are executed. The storage section 30 is made of, e.g., a rewritable involatile storage device.

Particularly, the storage section 30 stores various kinds of programs and various kinds of data being read out in order to realize the luminance control function, which is executed by the display control device 100. Concretely, the storage section 30 includes at least (i) a system information storage section 31 for storing system information related to the multi display system 1, (ii) an ordinary luminance storage section 32, (iii) a current status storage section 33, and (iv) a previous status storage section 34. The ordinary luminance storage section 32, which is made of a memory Kn, stores luminance setting values for an ordinary status which luminance setting values are of the respective display devices 200. The current status storage section 33, which is made of a memory Bn, stores current statuses of the respective display devices 200. The previous status storage section 34, which is made of a memory An, stores previous statuses of the respective display devices 200. Data structure of information stored in each storage section will be described in detail later.

(Function of Each Section of Main Control Section)

The status obtaining section 11 obtains, from the display devices 200 controlled by the display control device 100, pieces of status information of the respective display devices 200. The status information of the display device is information indicative of a status of the display device. Concretely, the status information includes a temperature status flag and a luminance setting value.

The temperature status flag (temperature formation) is a flag indicating that (i) a temperature of a specific part of the display device (e.g., an ambient temperature of an electronic component which may generate heat, for example, a light source or a light-emitting element; an ambient temperature of a component which is easily affected by a temperature; or an outside temperature) is within a predetermined normal temperature range or (ii) such the temperature is outside the range and a temperature abnormality occurs. In the present embodiment, the former status is regarded as "normal" and causes the temperature status flag to indicate "0"; and the latter status is regarded as "abnormality" and causes the temperature status flag to indicate "1". The above is one example of the temperature status flag. In another example, the status information may include, instead of the temperature status flag, a measured temperature. In this case, the display control device 100 may be configured to receive the status information and to compare the measured temperature (temperature information) with a predetermined normal temperature range, so as to determine the status as "normal" or "abnormality".

The luminance setting value is set for each of the display devices 200, and indicates a value of a screen luminance level that the display device 200 must achieve. The display device 200 adjusts, according to the luminance setting value which is set therefor, (i) a light amount of a light source included therein and/or (ii) a luminance level of a light-emitting element included therein so that the screen luminance level of the display section of the display device 200 attains the luminance setting value. In the present embodiment, each of the display devices 200 is configured as follows: The higher luminance setting value the display device 200 realizes, the more electric power the display device 200 consumes; further, along with the increase of electric power consumption, the temperature of the display device becomes higher.

The status obtaining section 11 transmits status information obtaining commands to the display devices 200, so as to obtain the pieces of status information of the respective display devices, i.e., the temperature status flags and the luminance setting values of the respective display devices. The pieces of status information thus obtained are stored in the current status storage section 33 individually for the display devices.

In the present embodiment, the status obtaining section 11 is configured to always keep up with latest status information (hereinafter, referred to as "current status information") by transmitting the status information obtaining commands at predetermined intervals and by updating the status information of the display devices at regular intervals.

The condition determining section 12 determines, according to the temperature status flags included in the pieces of status information, a condition of the multi display system 1 that the condition determining section 12 manages. Specifically, the condition determining section 12 determines, according the current status information obtained, whether or not a temperature abnormality occurs in any of the display devices belonging to the multi display system 1. Furthermore, the condition determining section 12 compares (i) the current status information with (ii) status information obtained previously (e.g., status information obtained in, of updating processes carried out at regular intervals, an updating process carried out just before the last updating process; hereinafter, referred to as "previous status information") so as to determine whether the abnormal status (or the normal status) is one which occurred before this time and is lasting since then or new one occurred this time.

According to the condition thus determined, the condition determining section 12 determines whether or not it is necessary to carry out a control process related to the luminance control function, which control process is to be executed by the display control processing section 13. Specifically, if the multi display system 1 is transitioned from a normal status to a temperature abnormality status, the condition determining section 12 instructs the display control processing section 13 to execute a temperature abnormality control process. On the other hand, if the multi display system 1 is transitioned from a temperature abnormality status to a normal status, the condition determining section 12 instructs the display control processing section 13 to execute a temperature abnormality control canceling process.

The display control processing section 13 executes the control process related to the luminance control function. Namely, the display control processing section 13 generates, for the display devices belonging to the multi display system, luminance change commands for instructing the display devices to carry out display operations according to a designated luminance setting value. Further, the display control processing section 13 transmits the luminance change commands to the respective display devices. More specifically, the display control processing section 13 generates the luminance change commands so that they include a luminance setting value which is common to all of the display devices 200, and transmits the luminance change commands to the respective display devices 200 in order that all the display devices 200 belonging to the multi display system 1 carry out display operations with the same luminance level or substantially the same luminance level.

For example, in a case where a temperature abnormality occurs, the display control processing section 13 sets, as a standard luminance setting value, a luminance setting value for an abnormal status (i.e., a lowest one of the luminance setting values) of the display device 200d, which has reduced its luminance level in order to deal with the temperature abnormality. Further, the display control processing section 13 instructs the rest of the display devices, i.e., the display devices 200a through 200c to set their luminance setting values to the standard luminance setting value. In a case where the multi display system 1 is recovered from the abnormal status to a normal status, the display control processing section 13 designates, with respect to the display devices 200, luminance setting values for an ordinary status which values are observed before the occurrence of the abnormality, in order that the display devices 200 are brought back to statuses that they had before the occurrence of the abnormality.

The above-described standard luminance setting value for an abnormal status is referred to as an "abnormal-status luminance setting value" (standard luminance setting value). Note that the abnormal-status luminance setting value is not limited to a lowest luminance setting value as in the above example. For example, assume that a temperature of a display device drops below a lower limit value of the normal temperature range. In this case, if the display device having the temperature abnormality sets its luminance level to be higher in order to increase its temperature, the display control processing section 13 may set, as the abnormal-status luminance setting value, a current luminance setting value of the display device, which current luminance setting value is set to be highest in order to deal with the temperature abnormality. In order to configure the display control processing section 13 as such, the status information preferably includes, instead of the temperature status flag indicative of only "abnormality" or "normal", temperature status information (temperature information) indicative of any of three temperature statuses, "abnormality with a temperature higher than a normal temperature", "abnormality with a temperature lower than a normal temperature", or "normal". Consequently, in a case where a status "abnormality with a temperature higher than a normal temperature" occurs in the multi display system 1, the display control processing section 13 can determine, as the abnormal-status luminance setting value, a lowest one of the luminance setting values of all the display devices 200. On the other hand, in a case where a status "abnormality with a temperature lower than a normal temperature" occurs in the multi display system 1, the display control processing section 13 can determine, as the abnormal-status luminance setting value, a highest one of the luminance setting values of all the display devices 200.

(Data of Storage Section)

The system information storage section 31 stores system information related to the multi display system 1, which is controlled by the display control device 100. Stored as the system information is, for example, display device IDs of the respective display devices 200 constituting the multi display system 1. Further, if necessary, the system information storage section 31 may store information such as model numbers, communication addresses, and specifications of the display sections of the display devices 200. Furthermore, the system information storage section 31 may store information indicative of a connection mode of the multi display system 1, e.g., information indicative of the order in which the display devices are connected from the upstream side to the downstream side.

The current status storage section 33, which is made of the memory Bn, stores the above-described current status information. Namely, the current status storage section 33 stores pieces of latest status information that the status obtaining section 11 has obtained from the display devices 200.

As shown in FIG. 1, the current status storage section 33 stores, as the current status information, current temperature status flags and current luminance setting values in such a manner that the current temperature status flags and the current luminance setting values are correspondingly associated with IDs of the respective display devices.

The previous status storage section 34, which is made of the memory An, stores the above-described previous status information. Namely, the previous status storage section 34 stores pieces of status information obtained in, of repeatedly-performed processes for obtaining status information, a process carried out just before the last process in which the pieces of latest current status information were obtained.

As shown in FIG. 1, the previous status storage section stores, as the previous status information, previous temperature status flags and previous luminance setting values in such a manner that the previous temperature status flags and the previous luminance setting values are correspondingly associated with IDs of the respective display devices.

In the present embodiment, the current status information currently stored in the memory Bn (current status storage section 33) is saved in the memory An (previous status storage section 34) as previous status information, before the status obtaining section 11 obtains latest current status information and carries out updating next. Then, new status information is obtained from the display devices 200, and is stored in the current status storage section 33 as current status information. Thus, the current status storage section 33 is configured to keep up with and store latest information.

The ordinary luminance storage section 32, which is made of the memory Kn, stores luminance setting values which are set for the respective display devices 200 during an ordinary (normal) status in which no temperature abnormality occurs.

In the present embodiment, the ordinary luminance storage section 32 is used to save, when a temperature abnormality occurs, the luminance setting values of the respective display devices 200 for a normal status. Specifically, in a case where (i) the previous temperature status flags for the previous process for obtaining the status information indicate "normal" and (ii) any of the current temperature status flags indicates "abnormality" in this time's process for obtaining the status information, the display control processing section 13 of the display control device 100 executes the temperature abnormality control process in order to deal with the temperature abnormality. Before instructing the display devices 200 to set their luminance setting values to the abnormal-status luminance setting value, the display control processing section 13 causes the previous luminance setting values stored in the previous status storage section 34, i.e., the luminance setting values for a normal status to be saved in the ordinary luminance storage section 32 as ordinary luminance setting values.

As shown in FIG. 1, the ordinary luminance storage section 32 stores the ordinary luminance setting values in such a manner that the ordinary luminance setting values are correspondingly associated with IDs of the respective display devices.

Consequently, when the temperature abnormality is eliminated and a normal status is attained again, the display control processing section 13 can immediately and easily set, for the respective display devices 200, the luminance setting values which were set in the normal status just before the occurrence of the abnormality.

[Configuration of Display Device]

FIG. 3 is a block diagram illustrating a configuration of a main part of each of the display devices 200a through 200d of the present embodiment. Note that the display devices 200a through 200d, illustrated in FIG. 2, have the same configuration. Therefore, FIG. 3 will be described by taking the display device 200a as an example.

As shown in FIG. 3, the display device 200a includes a main control section 40, a communication section 50, a storage section 60, a display section 51, a temperature measuring section 52, and a luminance changing section 53.

The main control section 40 centrally controls the sections included in the display device 200a, and includes, as functional blocks, at least a command executing section 42 and a status monitoring section 43. Further, since the devices are connected in series in the present embodiment, the main control section 40 includes a command selecting section 41 for determining whether received data is (i) a command for the display device 200a or (ii) data which is to be transmitted to upstream or downstream, in order to obtain only the command for the display device 200a. Each of the above functional blocks included in the main control section 40 can be achieved in such a manner that a CPU (central processing unit) retrieves a program stored in a storage device (not illustrated) made of, e.g., a ROM (read only memory), loads the program to a RAM (random access memory) or the like (not illustrated), and executes the program therein.

Consequently, the main control section 40 can execute (i) a function for monitoring a temperature of the display device 200a so as to control a luminance setting value thereof and obtaining status information of the display device 200a (hereinafter, referred to as a "temperature monitoring function"), (ii) a function for changing a luminance level according to an instruction from the display control device 100 (hereinafter, referred to as a "luminance changing function"), and (iii) a function for making a response by carrying out a process according to another command transmitted from the display control device 100 (hereinafter, referred to as a "command processing function"). The display device 200 of the present invention is configured to give priority to (i) the luminance changing function for changing the luminance level according to a command from the upstream device over (ii) the temperature monitoring function for changing the luminance level according to the judgment of the display device 200. A function of each functional block of the main control section 40 will be described in detail later.

The communication section 50 communicates with an upstream device and/or a downstream device connected with the display device 200a, so as to transmit/receive a message to/from the upstream device and/or the downstream device. In the case of the display device 200a, as shown in FIG. 2, the upstream device is the display control device 100, and the downstream device is the display device 200b. In a case of the display device 200d, the upstream device is the display device 200c, and no downstream device exists for the display device 200d.

Examples of the message transmitted/received by the devices encompass (i) a command transmitted from the display control device 100 to each display device 200 and (ii) a response transmitted, in response to such a command, from a display device 200 which is provided on the downstream side to the display control device 100.

The communication section 50 receives a command from the display control device 100, and transmits the command to a display device 200 which is provided downstream of the display device 200a. Further, the communication section 50 transmits, in response to a command, a response to a device (the display control device 100 or a display device 200) which is provided upstream of the display device 200a. Upon receiving a response from the downstream device, the communication section 50 transmits the response to the upstream device. The communication section 50 is realized by communication means such as RS-232C, wired LAN, wireless LAN, or HDMI.

The storage section 60 stores various kinds of data that the main control section 40 reads out when various kinds of functions of the display device 200a are executed. The storage section 60 is made of, e.g., a rewritable involatile storage device.

Particularly, the storage section 60 stores various kinds of programs and various kinds of data that are read out in order to realize the temperature monitoring function, the luminance changing function, and the command processing function, each of which is executed by the display device 200a. Concretely, the storage section 60 includes at least a system information storage section 61, a current status storage section 62, and a normal temperature range storage section 63. The system information storage section 61 stores system information related to the multi display system 1, to which the display device 200a belongs. The current status storage section 62 stores a current status of the display device 200a. The normal temperature range storage section 63 stores a normal temperature range indicative of a temperature range in which, the display device 200a operates normally. Data structure of information to be stored in each storage section will be described in detail later.

The display section 51 carries out, according to an image signal, a display expressing, e.g., an image, a moving image, and/or text information, which image signal is supplied externally (e.g., from the display control device 100). In the present embodiment, as one example, the display section 51 is made of a liquid crystal display. Alternatively, a display device of the present invention may include a display section 51 made of, e.g., an EL display, a plasma display, or an LED display device.

The temperature measuring section 52 measures a temperature of the display section 51. The temperature measuring section 52 is attached to, e.g., a specific part (a part close to an electronic component, etc.) of the display section 51. A temperature detected therein is measured by the temperature measuring section 52 as the temperature of the display section 51, and outputs a value thereof to the main control section 40 of the display device 200a. For example, the following configuration is considered: The temperature measuring section 52 is made of a semiconductor element such as a thermistor, and an electric resistance detected by the thermistor is converted into a corresponding numerical value indicative of a temperature, in order that the numerical value is used.

The luminance changing section 53 adjusts, according to the luminance setting value set by the main control section 40, a luminance level of the display section 51. For the luminance changing section 53, an appropriate configuration is employed in order to suit the method for adjusting the luminance level of the display section 51. For example, in a case where the display section 51 is made of a liquid crystal display, the luminance changing section 53 is made of a backlight control section for adjusting a luminance level of a light source (backlight) included in the display section 51.

(Configuration of Each Section of Main Control Section)

The command selecting section 41 selectively receives, among messages received by the communication section 50, a command which is transmitted for the display device 200a. Concretely, the command selecting section 41 first determines whether a received message is (i) a command transmitted from the upstream device or (ii) a response transmitted from the downstream device. If the received message is the response, the command selecting section 41 instructs the communication section 50 to transmit the received response to a device which is provided upstream of the display device 200a. Meanwhile, if the received message is a command, the command selecting section 41 determines whether or not the received command is for the display device 200a. If the command is for another device which is provided downstream of the display device 200a, the command selecting section 41 instructs the communication section 50 to transmit the command to the downstream device. On the other hand, if the command is for the display device 200a, the command selecting section 41 obtains the command and supplies it to the command executing section 42.

The command executing section 42 analyzes an instruction given by the command supplied from the command selecting section 41, and executes a process according to the command or instructs another process section to execute a process.

In the present embodiment, the command transmitted from the display control device 100 is, for example, a status information obtaining command, which instructs sending-back of status information of the display device 200a. Upon determining that the received command is the status information obtaining command, the command executing section 42 instructs the status monitoring section 43 to execute the above-described temperature monitoring function. Then, the command executing section 42 sends back, to the display control device 100, a response message including latest status information obtained by the status monitoring section 43.

If the command executing section 42 determines that the received command is the luminance change command, the command executing section 42 transmits an instruction to the luminance changing section 53 so that the luminance changing section 53 changes the luminance setting value to a luminance setting value designated by the command. Then, upon completion of the change of the luminance level, the command executing section 42 sends back, to the display control device 100, a response message including a completion report.

The status monitoring section 43 executes, according to the status information obtaining command, the temperature monitoring function. Concretely, the status monitoring section 43 monitors a temperature of the display device 200a, and, determines whether or not a temperature abnormality exists. If there exists an abnormality, the status monitoring section 43 adjusts the luminance setting value in order to eliminate the abnormality. Further, the status monitoring section 43 generates status information of the display device 200a according to the temperature of the display device 200a and the luminance setting value which is set.

Specifically, the status monitoring section 43 controls the temperature measuring section 52 so as to obtain a temperature of the display section 51. Subsequently, the status monitoring section 43 compares the temperature of the display section 51 with the normal temperature range stored in the normal temperature range storage section 63, so as to determine whether or not the temperature of the display section 51 is outside the normal temperature range. According to this determination, the status monitoring section 43 determines whether or not a temperature abnormality exits. If the status monitoring section 43 determines that no temperature abnormality exists, the status monitoring section 43 generates a current temperature status flag indicative of a value "normal", and stores, in the current status storage section 62, the current temperature status flag thus generated. On the contrary, if the status monitoring section 43 determines that a temperature abnormality exits, the status monitoring section 43 generates a current temperature status flag indicative of a value "abnormality", and stores, in the current status storage section 62, the current temperature status flag thus generated. Further, in a case where the status monitoring section 43 has adjusted the luminance setting value according to the measured temperature, the status monitoring section 43 stores a latest luminance setting value in the current status storage section 62, so as to update the status information.

As described above, the display device 200 is configured to give priority to (i) the luminance setting value which is designated by the display control device 100 through the luminance change command in the luminance changing function executed by the command executing section 42 over (ii) the luminance setting value set by the status monitoring section 43 in the temperature monitoring function executed by the status monitoring section 43.

With this configuration, even when the display device 200 is in a normal status, the display device 200 can adjust, according to an instruction from the display control device 100, its luminance level so as to be identical to a luminance level of another display device in which a temperature abnormality occurs.

(Data in Storage Section)

The system information storage section 61 stores system information related to the multi display system 1, to which the display device 200a belongs. Stored as the system information is, for example, display device IDs of the respective display devices 200 constituting the multi display system 1. Further, if necessary, the system information storage section 61 may store information such as model numbers, communication addresses, and specifications of the display sections of the display devices 200. Furthermore, the system information storage section 61 stores information indicative of a connection mode of the multi display system 1, e.g., information indicative of a display device provided upstream of each display device 200 and a display device provided downstream of each display device 200. This allows the command selecting section 41 to identify the upstream device and the downstream device.

The current status storage section 62 stores current status information of the display device 200a. As shown in FIG. 3, the current status storage section 62 stores, as the current status information, a current temperature status flag of the display device 200a and a current luminance setting value of the display device 200a in such a manner that the current temperature status flag and the current luminance setting value are associated with ID of the display device 200a.

The normal temperature range storage section 63 stores a normal temperature range defining a temperature range in which the display device 200a can operate normally. The status monitoring section 43 can detect a temperature abnormality of the display section 51 by comparing (i) the normal temperature range stored in the normal temperature range storage section 63 and (ii) the temperature measured by the temperature measuring section 52. Stored as the normal temperature range can be, e.g., an upper limit value and/or a lower limit value of a temperature range in which the display device 200a can operate normally.

[Flow of Process of Display Control Device]

Figure 4:
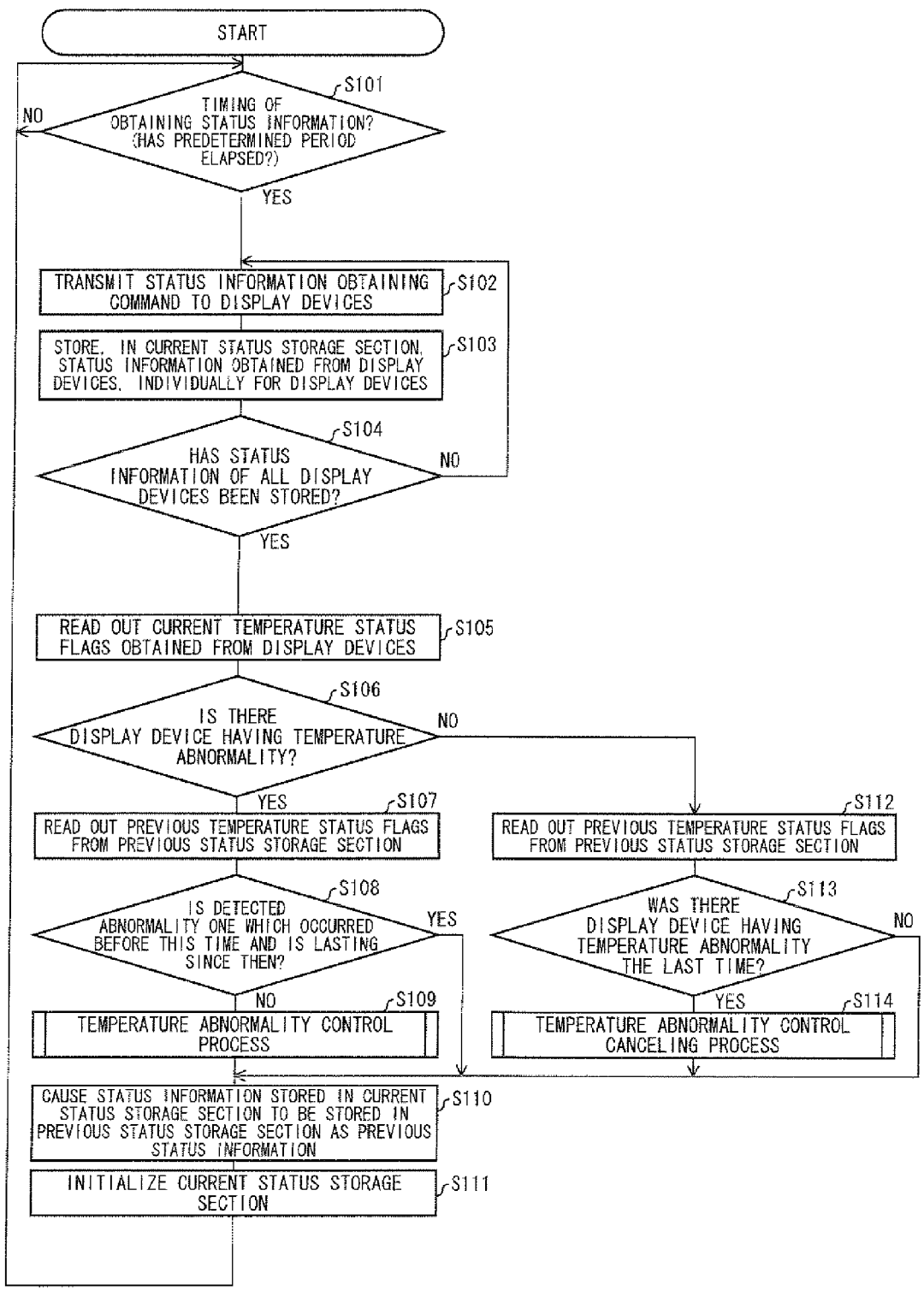
FIG. 4 is a flow chart illustrating a flow of a process carried out by the display control device according to the one embodiment of the present invention.

FIG. 4 is a flow chart illustrating a flow of a process carried out by the display control device 100 according to the present embodiment of the present invention. The display control device 100 executes a series of steps below so as to realize the luminance control function.

At a timing of obtaining pieces of status information from the respective display devices 200 in the multi display system 1 managed by the display control device 100 (YES in S101), the status obtaining section 11 of the display control device 100 transmits status information obtaining commands to the display devices 200 via the communication section 20 (S102). The timing of obtaining the status information can be a timing at which the multi display system 1 is boosted or a time point when a predetermined period has elapsed since status information was obtained the last time. The status information obtaining command is a command, for instructing a current temperature status flag and a current luminance setting value of the display device 200 to be transmitted to the display control device 100.

When the communication section 20 receives pieces of status information as responses from the respective display devices 200a through 200d, the status obtaining section 11 stores the pieces of status information in the current status storage section 33. Concretely, the status obtaining section 11 correspondingly associates (i) current temperature status flags and current luminance setting values included in the pieces of status information with (ii) display device IDs of the display devices which are the transmission sources. Then, the status obtaining section 11 stores, in the current status storage section 33, the current temperature status flags and the current luminance setting values thus associated with the display device IDs, individually for the display devices 200 (S103).

The status obtaining section 11 determines whether or not the pieces of status information of all the display devices 200a through 200d in the multi display system 1 have been stored in the current status storage section 33 (S104). If the status obtaining section 11 determines that there is status information which is not stored yet (NO in S104), the status obtaining section 11 goes back to S102 so as to attempt again to obtain, from a display device which has the status information not stored in the current status storage section 33 yet, the status information.

If the status obtaining section 11 determines that the pieces of status information of all the display devices 200a through

200d have been stored (YES in S104), the condition determining section 12 then reads out the current temperature status flags of the respective display devices 200a through 200d, which temperature status flags are stored in the current status storage section 33 (S105).

The condition determining section 12 determines, according to the current temperature status flags of the respective display devices thus read out, whether or not there exists a display device in which a temperature abnormality occurs (S106).

If the condition determining section 12 determines that there exists the display device in which a temperature abnormality occurs (YES in S106), the condition determining section 12 then reads out previous temperature status flags stored in the previous status storage section 34 (S107). The condition determining section 12 checks a previous temperature status flag of the display device which has been determined in S106 as having the temperature abnormality, so as to determine whether or not the temperature abnormality detected in S106 is one which occurred before this time and is lasting since then (S108).

If the condition determining section 12 determines that a status detected the last time was normal and the temperature abnormality detected in S106 is new one occurred this time (NO in S108), the condition determining section 12 determines that it is necessary to take a measure against the temperature abnormality, and instructs the display control processing section 13 to execute the temperature abnormality control process. According to this instruction, the display control processing section 13 carries out the temperature abnormality control process (S109). Note that a flow of the temperature abnormality control process will be described later with reference to another drawing. On the other hand, if the condition determining section 12 determines that the status detected the last time was also abnormal and the abnormality detected this time is one which occurred before this time and is lasting since then (YES in S108), the condition determining section 12 determines that the temperature abnormality control process which has been carried out so far should be continued, and does not transmit any new instruction to the display control processing section 13. In this case, the temperature abnormality control process is continued by the display control processing section 13.

When a series of the above steps is ended, the status obtaining section 11 causes the current status information obtained and stored in S103 to be stored in the previous status storage section 34 as previous status information (S110). Thereafter, the status obtaining section 11 initializes the current status storage section 33 (S111) so as to prepare for the next timing for obtaining status information.

If the condition determining section 12 determines that there is no display device in which a temperature abnormality occurs (NO in S106), the condition determining section 12 then reads out the previous temperature status flags stored in the previous status storage section 34 (S112). According to the previous temperature status flags of all the display devices, the condition determining section 12 determines whether or not there exists a display device in which a temperature abnormality occurred the last time, so as to determine whether or not the normal status detected in S106 is one which occurred before this time and is lasting since then (S113).

If the condition determining section 12 determines that a temperature abnormality occurred the last time and the normal status detected in S106 is new one achieved as a result of eliminating the temperature abnormality (YES in S113), the condition determining section 12 determines that it is necessary to cancel the measure against the temperature abnormality which has been carried out so far, and instructs the display control processing section 13 to execute the temperature abnormality control canceling process. According to this instruction, the display control processing section 13 carries out the temperature abnormality control canceling process (S114). Note that a flow of the temperature abnormality control canceling process will be described with reference to another drawing. On the other hand, if the condition determining section 12 determines that the status detected the last time was also normal and the normal status detected this time is one which occurred before this time and is lasting since then (NO in S113), the condition determining section 12 determines that the current status should be maintained and does not transmit any instruction to the display control processing section 13. In this case, the luminance levels of the display devices 200 are maintained according to luminance setting values currently designated with respect to the display devices 200.

When a series of the above steps is ended, the status obtaining section 11 causes the previous status storage section 34 to store, as previous status information, the current status information obtained and stored in S103 (S110). Thereafter, the status obtaining section 11 initializes the current status storage section 33 (S111) so as to prepare for the next timing for obtaining status information (the procedure returns to S101).

(Temperature Abnormality Control Process)

Figure 5:
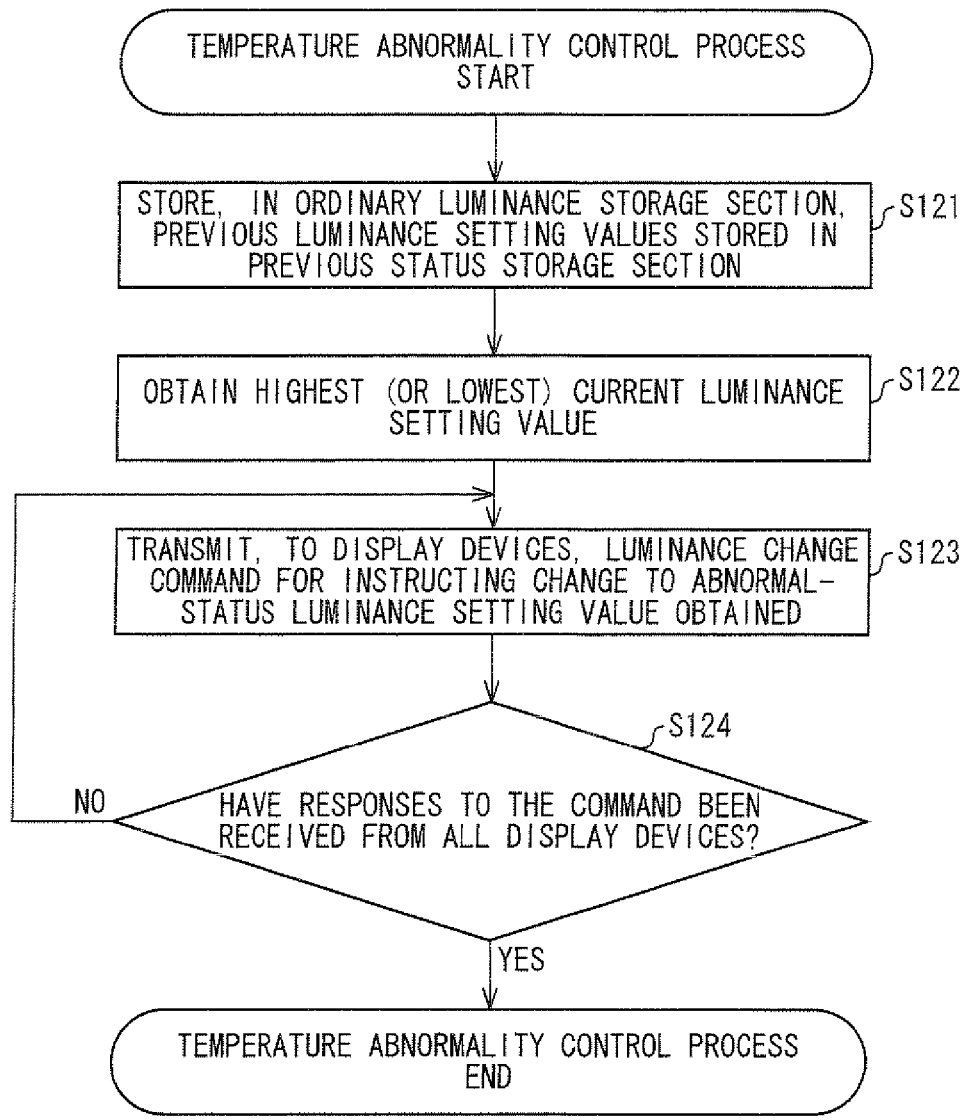
FIG. 5 is a flow chart illustrating a flow of a temperature abnormality control process carried out by a display control processing section of the display control device.

FIG. 5 is a flow chart illustrating a flow of the temperature abnormality control process (S109 in FIG. 4) executed by the display control processing section 13 of the display control device 100.

First, the display control processing section 13 reads out the previous luminance setting values stored in the previous status storage section 34, and causes the ordinary luminance storage section 32 to store, individually for the display devices 200, the previous luminance setting values as luminance setting values for recovering (ordinary luminance setting values), which are to be used when the status is recovered to normal (S121).

Next, the display control processing section 13 obtains, of the current luminance setting values stored in the current status storage section 33, a current luminance setting value of a display device which sets its luminance setting value to be lowest (or highest) in order to deal with the temperature abnormality, and sets the obtained current luminance setting value as an abnormal-status luminance setting value (S122).

Subsequently, the display control processing section 13 generates luminance change commands for the respective display devices 200, and transmits the luminance change commands to the respective display devices 200 via the communication section 20 (S123). The luminance change command is a command for instructing the luminance setting value of each of the display devices 200a through 200d to be changed to the abnormal-status luminance setting value obtained in S122. Now, assume that, for example, the display device 200d is dealing with the temperature abnormality by setting its luminance setting value to be lowest. In this case, the luminance change command is not necessary for the display device 200d, whose luminance setting value has been already set to the abnormal-status luminance setting value. Therefore, in this case, it is preferable that the above luminance change commands are transmitted to the display devices 200a through 200c, but not to the display device 200d.

Here, the communication section 20 receives, from the respective display devices 200a through 200c, responses including completion reports informing that the luminance setting values have been changed. The display control processing section 13 determines whether or not the communication section 20 has received such responses from all the display devices 200a through 200c (S124). If the display control processing section 13 determines that the communication section 20 has received, from all the display devices 200a through 200c, the responses including the completion reports (YES in S124), the display control processing section 13 ends the temperature abnormality control process. On the other hand, if there is a display device 200 from which the communication section 20 has not received a response yet (NO in S124), the display control processing section 13 instructs the communication section 20 to transmit the luminance change command again to that display device 200. Namely, until the communication section 20 receives the responses including the completion reports from all the display devices 200 to which the luminance change commands must be transmitted, the display control processing section 13 repeatedly carry out the operations in S123 and S124.

According to the above method, even in a case where a temperature abnormality occurs in part of the display devices 200 in the multi display system 1, a display device whose luminance level is to be changed is not only the part of the display devices 200; rather, the luminance levels of all the display devices 200 included in the multi display system 1 are uniformly changed according to the luminance level of the display device 200 in which the temperature abnormality occurs. Consequently, it is possible to prevent a variation between the luminance levels of the display devices 200 in the multi display system 1, thereby preventing an impairment of visibility in display of the multi display system 1.

(Temperature Abnormality Control Canceling Process)

Figure 6:
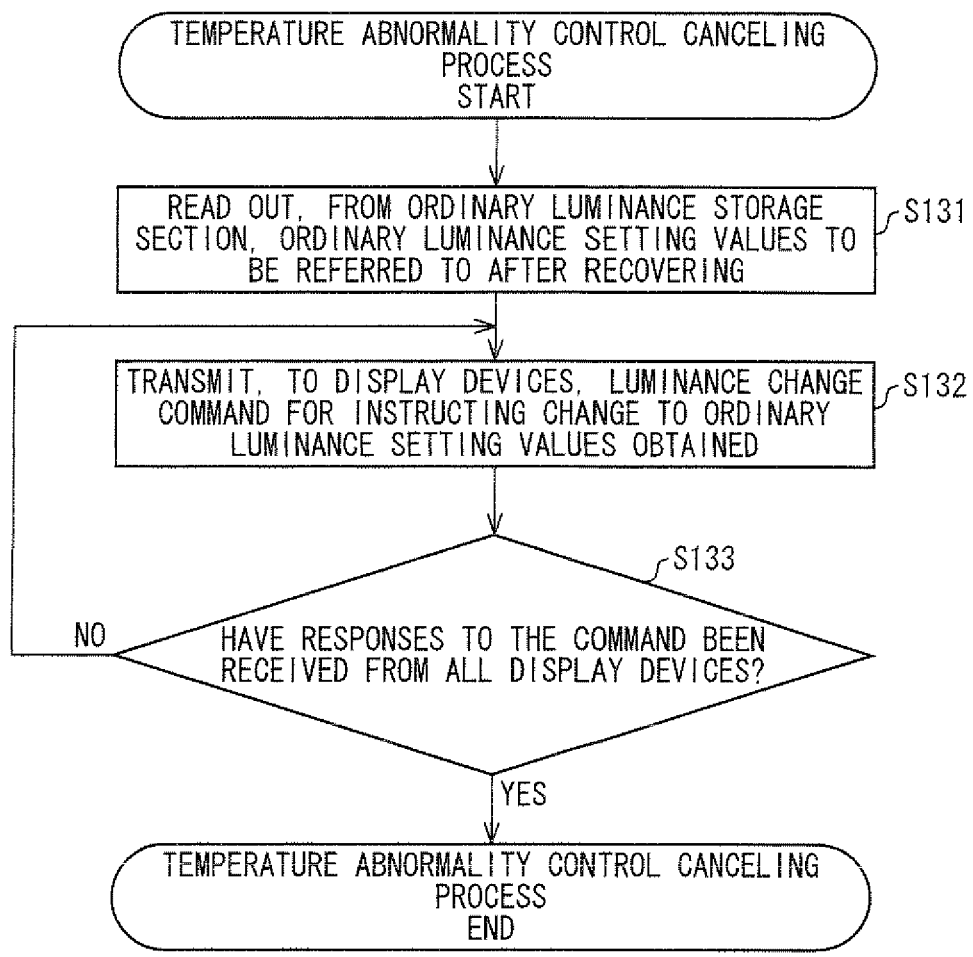
FIG. 6 is a flow chart illustrating a flow of a temperature abnormality control canceling process carried out by the display control processing section of the display control device.

FIG. 6 is a flow chart illustrating a flow of the temperature abnormality control canceling process (S114 in FIG. 4) executed by the display control processing section 13 in the display control device 100.

First, the display control processing section 13 reads out the ordinary luminance setting values of the respective display devices 200 stored in the ordinary luminance storage section 32 (S131).

Next, the display control processing section 13 generates, for the respective display devices 200a through 200d, luminance change commands for instructing luminance setting values currently set in the respective display devices 200a through 200d to be changed to their corresponding ordinary luminance setting values, and transmits the luminance change commands to the respective display devices 200 via the communication section 20 (S132).

Here, the communication section 20 receives, from the respective display devices 200, responses including completion reports informing that the luminance setting values have been changed. The display control processing section 13 determines whether or not the communication section 20 has received such responses from all the display devices 200a through 200d (S133). If the display control processing section 13 determines that the communication section 20 has received, from all the display devices 200a through 200d, the responses including the completion reports (YES in S133), the display control processing section 13 ends the temperature abnormality control canceling process. On the other hand, if there is a display device 200 from which the communication section 20 has not received a response yet (NO in S133), the display control processing section 13 instructs the communication section 20 to transmit the luminance change command again to that display device 200. Namely, until the communication section 20 receives the responses including the completion reports from all the display devices 200, the display control processing section 13 repeatedly carry out the operations in S132 and S133.

[Flow of Process of Display Device]

Figure 7:
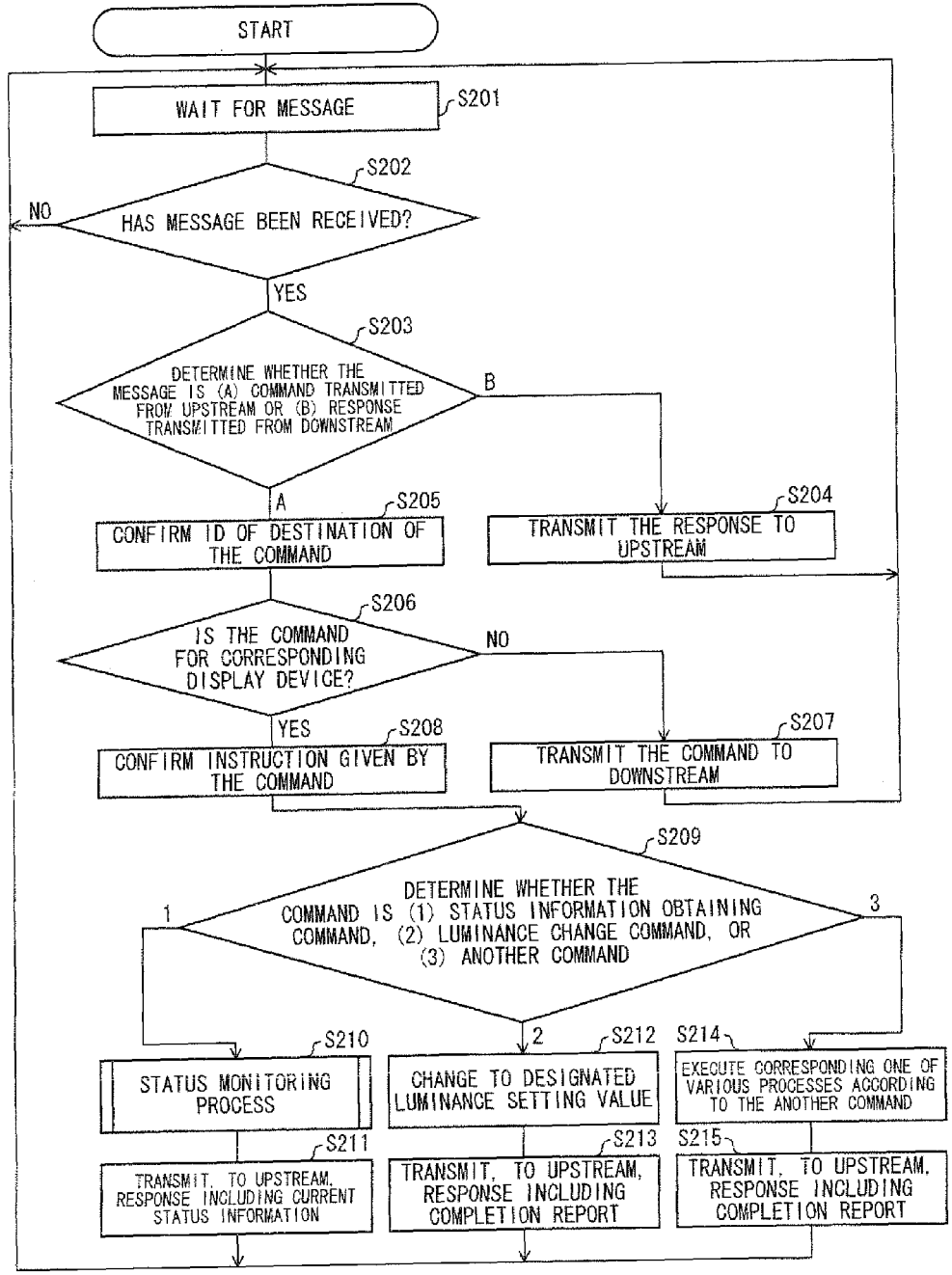
FIG. 7 is a flow chart illustrating a flow of a process carried out by the display device according to the one embodiment of the present invention.

FIG. 7 is a flow chart illustrating a flow of a process carried out by the display device 200 according to the present embodiment of the present invention. Note that operations carried out with respect to an upstream device and a downstream device are common to the display devices 200a through 200d. Therefore, FIG. 7 will be explained by taking operations of the display device 200a as an example.

After the multi display system 1 is boosted, while carrying out a display based on an image signal according to an instruction from the display control device 100, the display device 200a is in a message waiting status in which the display device 200a can receive a message from the upstream device or the downstream device (S201).

Here, if the communication section 50 receives a message externally (YES in S202), the command selecting section 41 determines whether the received message is (i) a command transmitted from the upstream device (here, the display control device 100) or (ii) a response transmitted from the downstream device (here, the display device 200b) (S203).

If the command selecting section 41 determines that the received message is the response transmitted from the downstream device (B in S203), the command selecting section 41 transmits the received response to the upstream device (display control device 100) via the communication section 50 without making any modification to the response (S204).

On the other hand, if the command selecting section 41 determines that the received message is the command transmitted from the upstream device in S203), the command selecting section 41 confirms a display device ID which is set as a destination of the command (S205).

If the command selecting section 41 determines that the display device ID which is set as the destination of the command does not match with a display device ID of the display device 200a but matches with that of another device which is provided downstream of the display device 200a (NO in S206), the command selecting section 41 transmits the received command to the downstream device (here, the display device 200b) via the communication section 50 without making any modification to the command (S207).

On the other hand, if the command selecting section 41 determines that the display device ID which is set as the destination of the received command matches with the display device ID of the display device 200a and thus determines the command is for the display device 200a (YES in S206), the command selecting section 41 accepts the command and supplies the command to the command executing section 42.

Subsequently, the command executing section 42 analyzes the received command so as to confirm an instruction given by the command (S208).

If the command executing section 42 determines that the received command is a status information obtaining command (1 in S209), the command executing section 42 instructs the status monitoring section 43 to execute the "status monitoring process", which is a process for realizing the temperature monitoring function. According to this instruction, the status monitoring section 43 executes the status monitoring process, and determines the current status (current status information) of the display device 200a (S210). Note that a flow of the status monitoring process will be described later with reference to another drawing.

When the status monitoring process is ended and the command executing section 42 obtains the current status information of the display device 200a from the status monitoring section 43, the command executing section 42 generates a response including the current status information, and transmits the response to the display control device 100, which is the upstream device, via the communication section 50 (S211). When the response is transmitted in response to the accepted command and a series of the steps are ended, the display device 200a returns to the message waiting status in S201.

Alternatively, if the command executing section 42 determines that the received command is a luminance change command (2 in S209), the command executing section 42 controls the luminance changing section 53 so as to carry out the luminance changing function (S212). Concretely, the command executing section 42 changes the current luminance setting value stored in the current status storage section 33 to the luminance setting value designated by the luminance change command. According to the luminance setting value thus changed, the luminance changing section 53 changes the luminance level of the display section 51. When the luminance level has been changed by the luminance changing section 53, the command executing section 42 generates a response including a completion report informing that the luminance level has been changed, and transmits the response to the upstream device via the communication section 50 (S213). When the response is transmitted in response to the accepted command and a series of the steps are ended, the display device 200a returns to the message waiting status in S201.

Further alternatively, if the command executing section determines that the received command is another command (3 in S209), the command executing section 42 executes a corresponding one of various processes according to an instruction given by the command or instructs another process section to executes the process (S214). After carrying out the above-described command processing function, the command executing section 42 generates a response including a completion report thereof, and transmits the response to the upstream device via the communication section 50 (S215). When the response is transmitted in response to the accepted command and a series of the steps are ended, the display device 200a returns to the message waiting status in S201.

(Status Monitoring Process)

Figure 8:
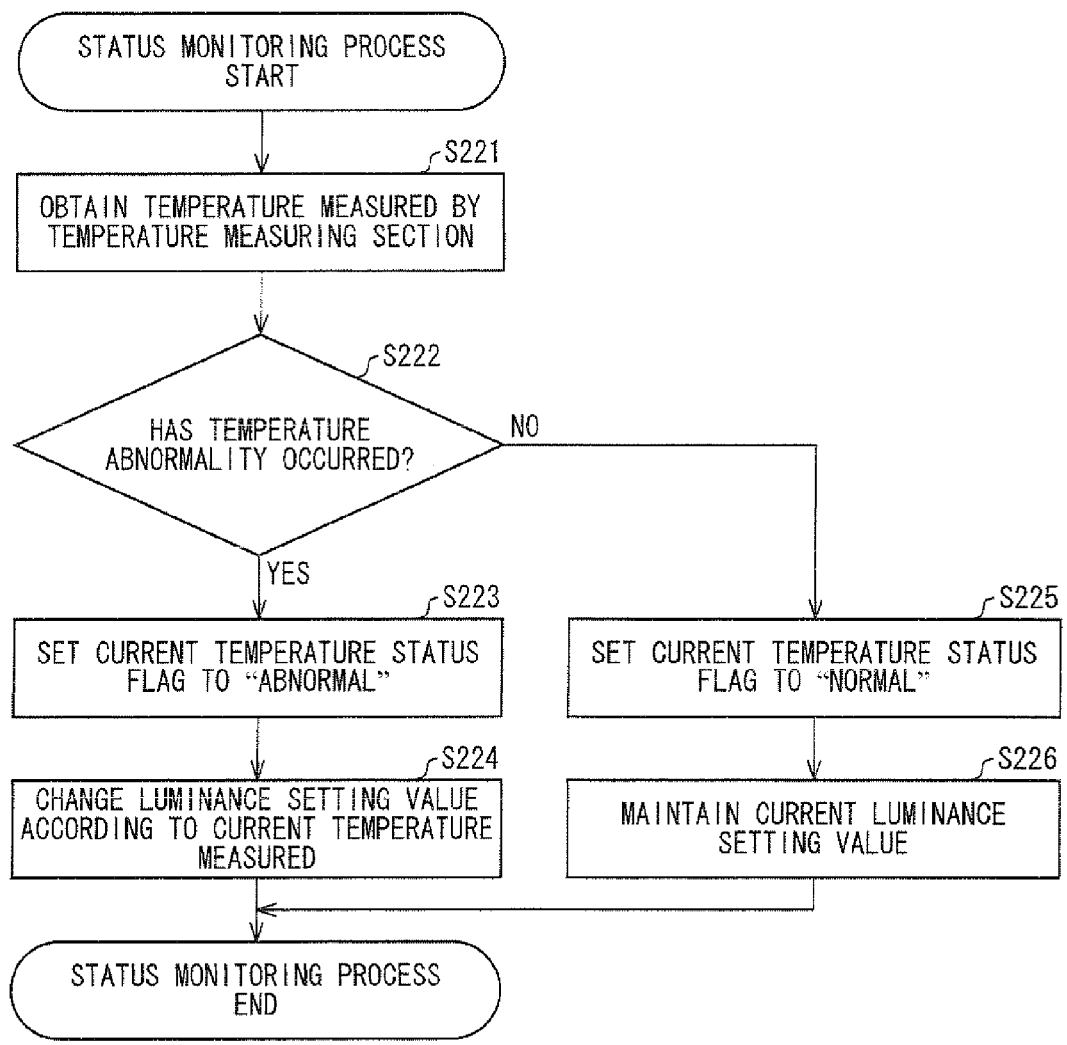
FIG. 8 is a flow chart illustrating a flow of a status monitoring process executed by a status monitoring section of the display device.

FIG. 8 is a flow chart illustrating a flow of the status monitoring process (S210 in FIG. 7) executed by the status monitoring section 43 of the display device 200.

First, the status monitoring section 43 obtains a temperature of the display section 51 from a result of measurement carried out by the temperature measuring section 52 (S221). Next, the status monitoring section 43 compares the obtained temperature of the display section 51 with the normal temperature range stored in the normal temperature range storage section 63, so as to determined whether or not a temperature abnormality occurs (S222).

If the status monitoring section 43 determines that a temperature abnormality occurs (YES in S222), the status monitoring section 43 sets, to a value indicating that the temperature abnormality occurs, the current temperature status flag of its corresponding display device 200 which current temperature status flag is stored in the current status storage section 62 (S223). Then, the status monitoring section 43 changes, according to the temperature of the display section 51 obtained from the temperature measuring section 52, the current luminance setting value stored in the current status storage section 62 (S224). For example, in a case where the temperature of the display section 51 has increased to an abnormal level, the status monitoring section 43 sets a low luminance setting value for the purpose of suppressing consumption of electric power in order to reduce the temperature.

Consequently, the luminance changing section 53 changes the luminance level of the display section 51 according to the luminance setting value thus changed.

On the other hand, if the status monitoring section 43 determines that no temperature abnormality occurs (NO in S222), the status monitoring section 43 sets the current temperature status flag stored in the current status storage section 62 to a value indicating that no temperature abnormality occurs (S225). Then, the status monitoring section 43 maintains the luminance setting value which is currently set (S226).

The status monitoring section 43 sends back, to the command executing section 42, the current status information of its corresponding display device 200 stored in the current status storage section 62 at a time point when a series of the above steps is completed.

The above method enables to always supply, in response to the status information obtaining command from the display control device 100, latest information (the presence or absence of a temperature abnormality and the status of the display device 200) to the display control device 100. Further, the above method allows each display device 200 to adjust, if a temperature abnormality occurs in the multi display system 1, the luminance level of the display section 51, in response to the luminance change command from the display control device 100, according to the abnormal-status luminance setting value which is common to all the display devices 200. This makes it possible to prevent a variation between the luminance levels of the display devices included in the multi display system, thereby preventing an impairment of visibility of the entire multi display.

Figure 9:
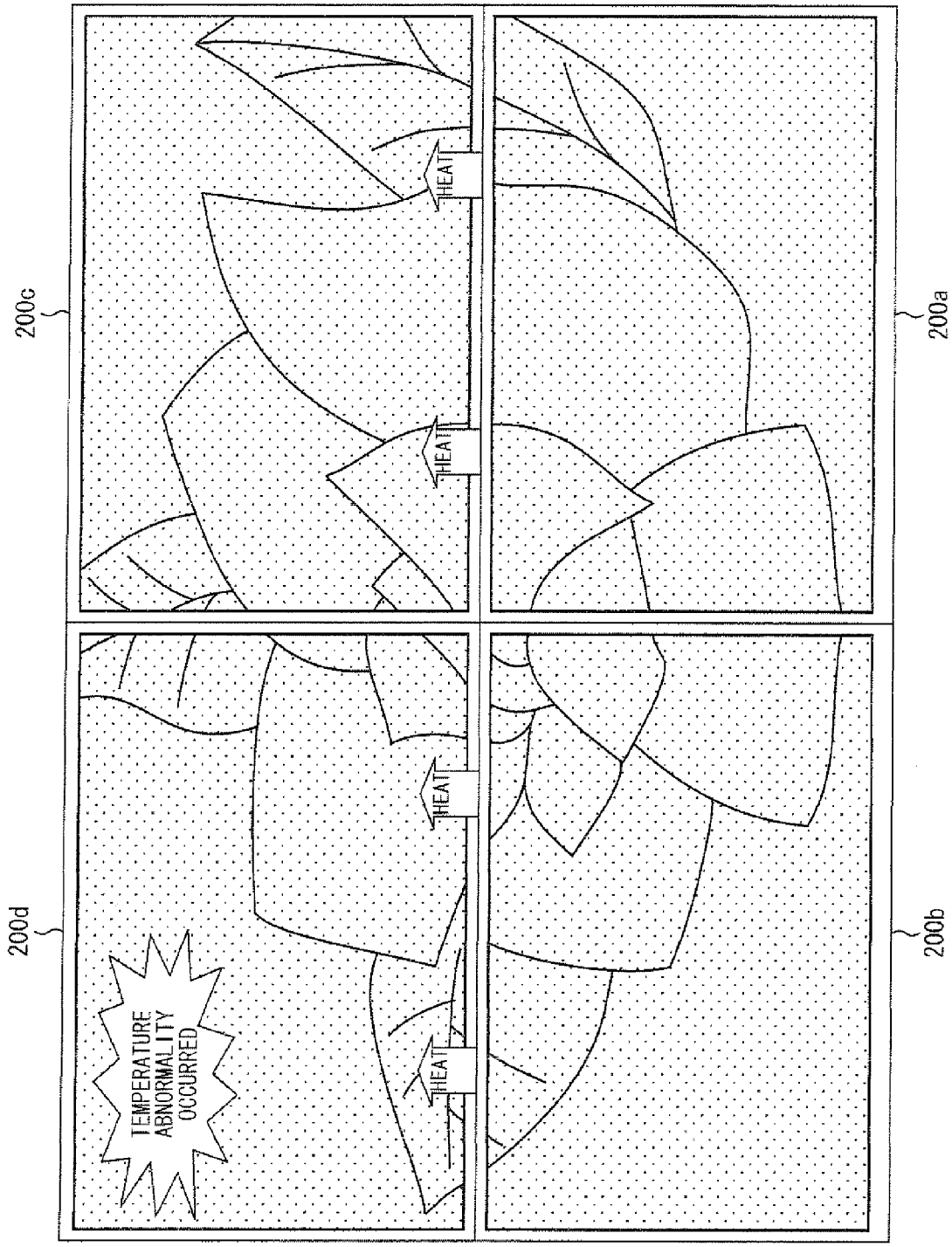
FIG. 9 is a view illustrating a state where an image is displayed by display devices in a multi display system of the present invention.
Figure 13:
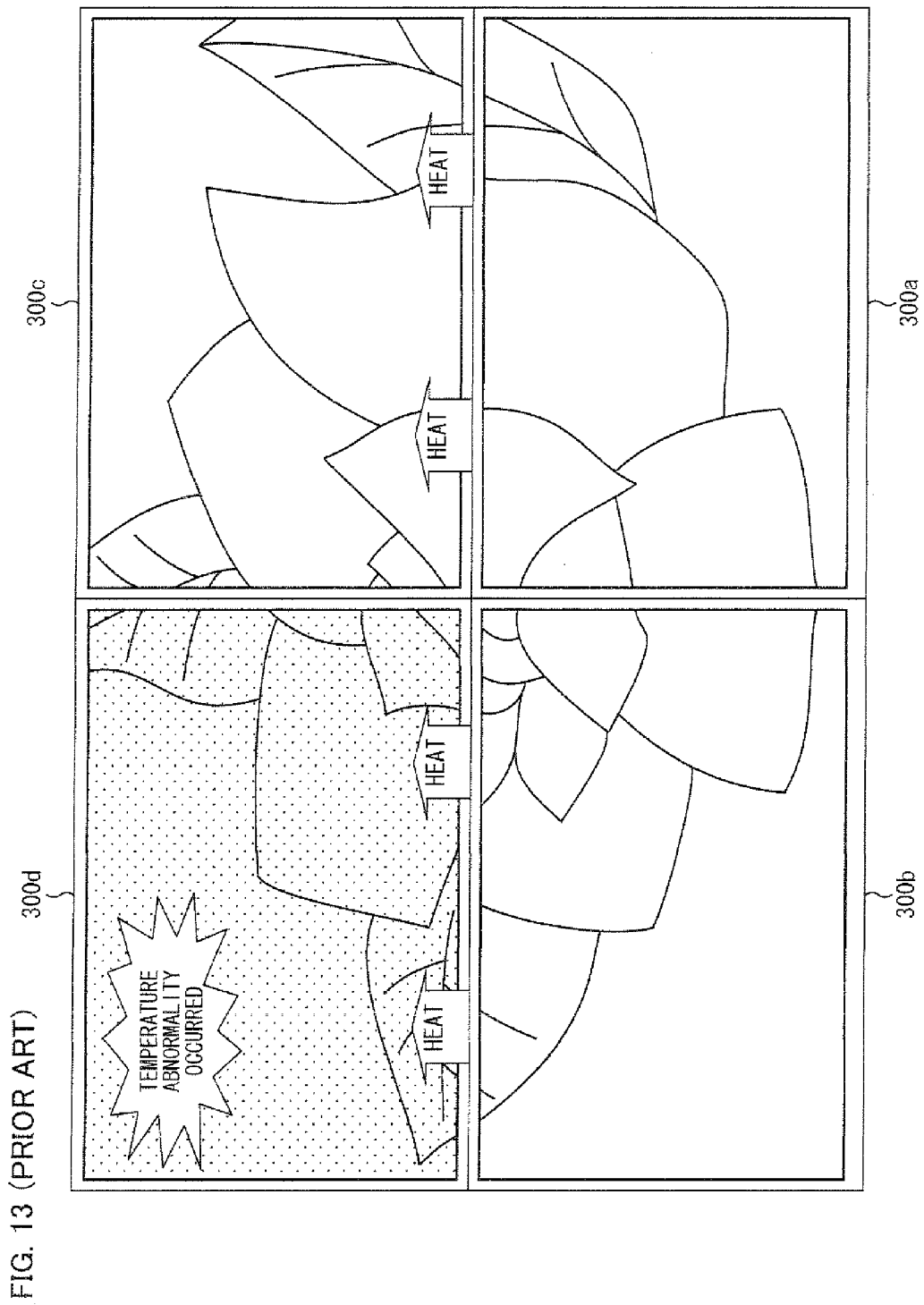
FIG. 13 is a view illustrating a state where an image is displayed by display devices in a conventional multi display system.

FIG. 9 is a view illustrating a state where an image is displayed by display devices in a multi display system 1 of the present invention. FIG. 13 is a view illustrating a state where an image is displayed by display devices in a conventional multi display system.

As shown in FIG. 9, the multi display system is configured to include four display devices 200a through 200d of the present invention, the display devices 200a through 200d being arranged in a 2×2 (horizontally and vertically) matrix. For example, assume that a temperature change (e.g., a temperature abnormality with a high temperature exceeding a normal range) occurs in one of the display devices 200a through 200d (e.g., the display device 200d at the upper left). In this case, the display device 200d reduces its luminance setting value so as to reduce a luminance level of a display section 51 of the display device 200d.

Information of the reduced luminance setting value of the display device 200d and a temperature status flag indicative of "abnormality" are transmitted to the display control device 100 as current status information. The display control device 100 checks pieces of current status information obtained from all the display devices 200, and determines that the luminance setting value of the display device 200d is the lowest. Then, the display control device 100 sets the luminance setting value of the display device 200d as a standard abnormal-status luminance setting value, and transmits a notice of the standard abnormal-status luminance setting value to the rest of the display devices 200, i.e., the display devices 200a through 200c.

According to the above configuration, all the display devices 200a through 200d belonging to the multi display system 1 each reduce a luminance level of its display section 51 according to the abnormal-status luminance setting value which is common to all the display devices 200a through 200d, in order to reduce temperatures of the display sections 51 in the entire multi display system 1.

This allows, as shown in FIG. 9, the luminance levels of all the display devices 200a through 200d to be identical to each other. Consequently, this makes it possible to prevent a variation between the luminance levels of the display devices, thereby preventing an impairment of visibility of the entire multi display.

Furthermore, according to a multi display system 1 of the present invention, the following effects are also achieved:

For example, in a conventional multi display system, as shown in FIG. 13, display devices 300a through 300c, i.e., display devices other than a display device 300d in which a temperature abnormality occurs, do not adjust their luminance setting values as long as the display devices 300a through 300c are normal. Therefore, the display devices 300a through 300c continue to carry out display operations according to their respective luminance setting values for a normal status, and therefore temperatures of the display devices 300a through 300c, each of which is adjacent to the display device 300d, are transmitted to the display device 300d. This causes a problem that the temperature abnormality of the display device 300d is hardly eliminated only by adjusting the luminance level of the display device 300d. Especially in a case of dealing with a temperature abnormality with a high temperature which temperature abnormality occurs in a display device in the upper row (in the example shown in FIG. 13, the display device 300c or 300d), the difficulty in eliminating the temperature abnormality becomes particularly serious, since heat is easily transmitted from the lower row to the upper row.

On the other hand, in the present embodiment, as shown in FIG. 9, in a case where a temperature abnormality occurs in the display device 200d in the multi display system 1 of the present invention, it is possible to set the luminance levels of the respective display devices 200a through 200c to be identical to a luminance level set by the display device 200d. Therefore, it is possible to change, in the same way as that for the display device in which the temperature abnormality occurs, temperatures of the display devices provided in the vicinity of the display device in which the temperature abnormality occurs. For example, by reducing the luminance setting values of the display devices 200a through 200c to the luminance setting value of the display device 200d, temperatures of the display devices 200a through 200c, each of which is adjacent to the display device 200d, can also be reduced. Consequently, it is possible to reduce an amount of heart transmitted to the display device 200d from the display devices 200a through 200c, as compared with the conventional configuration. As a result, the temperature abnormality occurring in the display device 200d can be eliminated more easily.

Embodiment 2

Figure 10:
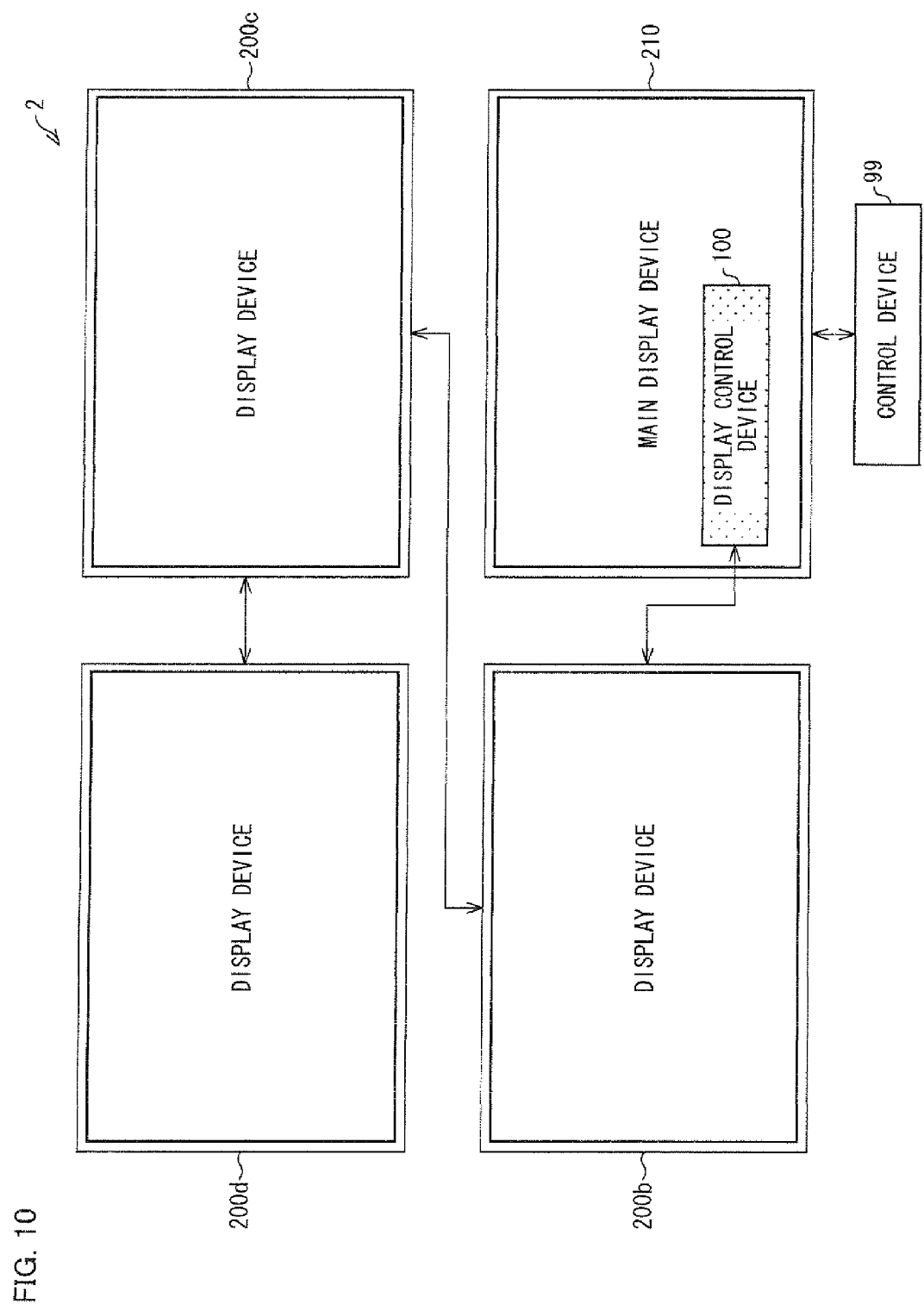
FIG. 10 is a view schematically illustrating a configuration of a multi display system according to another embodiment of the present embodiment.
Figure 11:
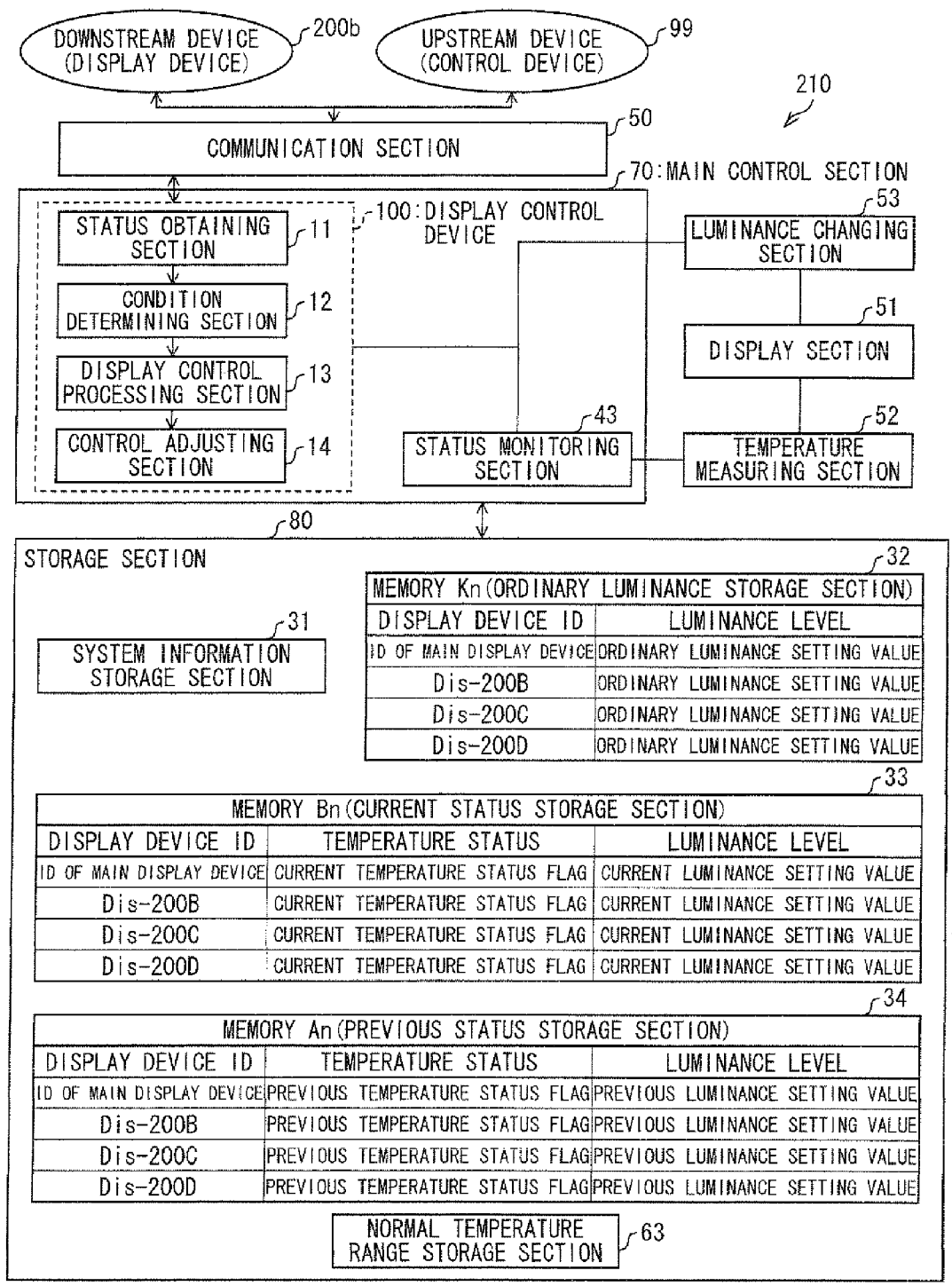
FIG. 11 is a block diagram illustrating a configuration of a main part of a main display device according to said another embodiment of the present embodiment.
Figure 12:
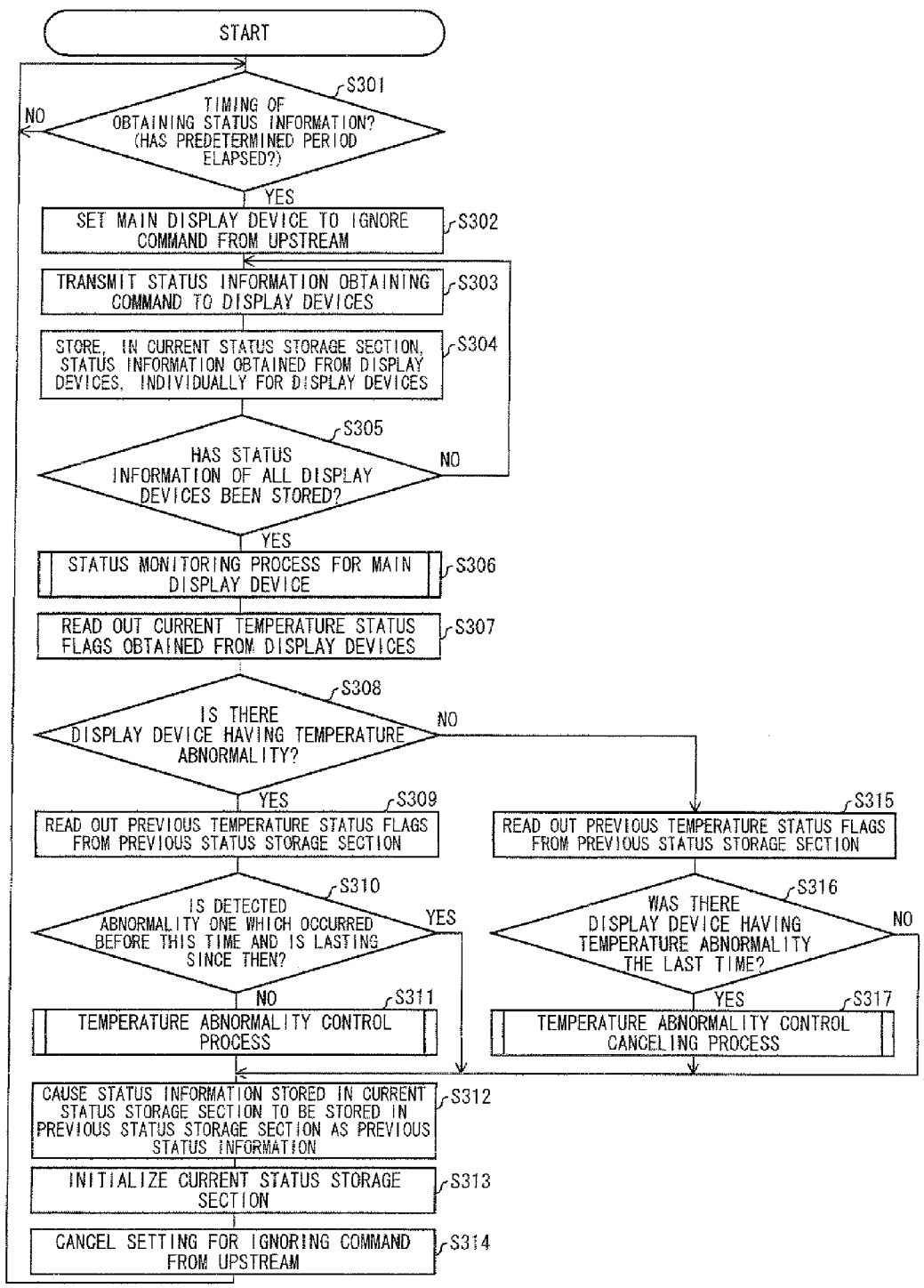
FIG. 12 is a flow chart illustrating a flow of a process carried out by the main display device according to said another embodiment of the present embodiment.

The following will describe another embodiment of the present invention with reference to FIGS. 10 through 12.

In the above-described embodiment, the control device for centrally controlling the display devices in the multi display system 1 serves as the "display control device (100)" of the present invention, and carries out control (luminance control function) of luminance levels of all the display devices belonging to the multi display system 1.

However, a configuration of a multi display system of the present invention is not limited to the above example. For example, the present invention encompasses a multi display system configured as follows: The control device for centrally controlling the display devices specializes in execution of the image signal output function as with conventional configurations, and one of the display devices belonging to the multi display system includes a "display control device (100)" of the present invention. The display device including the display control device 100 obtains from the control device an authority to control the multi display system, only when checking for a temperature abnormality and dealing with the abnormality, i.e., only when carrying out the above-described luminance control function. Further, the display device including the display control device 100 carries out the luminance control function with respect to all the display devices 200, including the display device including the display control device 100.

[Configuration of Multi Display System]

FIG. 10 is a view schematically illustrating a configuration of a multi display system according to the present embodiment.

As shown in FIG. 10, a multi display system 2 includes (i) a total of four display devices arranged in a 2×2 (horizontally and vertically) matrix and (ii) a control device such as a PC for centrally controlling these display devices. Of the four display devices, a display device which is provided on the uppermost stream side and is connected with the control device 99 is a main display device 210, which serves as a master, and display devices which are provided downstream of the main display device 210 are display devices 200b through 200d, each of which serves as a slave.

In the present embodiment, as described above, the main display device 210 serves not only as a display device belonging to the multi display system 2, but also as the "display control device" of the present invention, since the main display device 210 includes the display control device 100.

In the present embodiment, as one example, the four display devices, i.e., the main display device 210 and the display devices 200b through 200d are arranged such that the control device 99 (which is on the uppermost stream side), the main display device 210, the display device 200b, the display device 200c, and the display device 200d are connected in series in this order from the upstream side to the downstream side. In the present embodiment, the control device 99 has a function (image signal output function) for controlling display content which is to be displayed on the main display device 210 and the display devices 200b through 200d. On the other hand, the main display device 210, which includes the display control device 100, has a function (luminance control function) for controlling luminance levels by monitoring temperatures of the respective display devices.

In order that the main display device 210 carries out the luminance control function, the devices transmit/receive a command and a response to the command. In order to enable the transmission/reception, the devices in the multi display system 2 can be connected with each other by any of various kinds of communication means, e.g., RS-232C, wired/wireless LAN (Local Area Network), HDMI (High Definition Multimedia Interface) CEC.

The display devices are connected in series in such a manner that the main display device 210, which is on the uppermost stream side, is connected with the display devices on the downstream side. Therefore, each of the display devices 200b through 200d receives, via the communication means from a device which is provided upstream of said each of the display devices 200b through 200d, a command outputted by the main display device 210; further, if the received command is for a device which is provided downstream of said each of the display devices 200b through 200d, said each of the display devices 200b through 200d transmits the command to a device (downstream device) which is directly connected with said each of the display devices 200b through 200d on its downstream side. Meanwhile, in order that said each of the display devices 200b through 200d transmits a response to the command to the main display device 210, said each of the display devices 200b through 200d transmits the response to a device (upstream device) which is directly connected with said each of the display devices 200b through 200d on its upstream side. Also, in a case where said each of the display devices 200b through 200d receives a response from the downstream device, said each of the display devices 200b through 200d transmits the response to the upstream device. As a result, commands transmitted from the display control device 100 of the main display device 210 to the display devices 200b through 200d are received by all of the display devices 200. Further, responses from the respective display devices 200 to the commands are collected in the display control device 100 of the main display device 210.

A major difference between the multi display system 2 of the present embodiment and the multi display system 1 shown in FIG. 2 is that the main display device 210 blocks, only when carrying out the luminance control function, a command from the control device 99 in order to take a control authority.

Note that the connection mode of the devices shown in FIG. 10 is merely one example, and does not have any intention to limit a configuration of a multi display system 2 of the present invention. For example, the present invention also encompasses a connection mode in which the control device 99 and the main display device 210 are connected in series, and the main display device 210 and the other display devices 200 are connected with each other in parallel by use of a hub. Such the connection mode in which the display control device 100 of the main display device 210 directly communicates with all the display devices 200 is also encompassed in the present invention.

Next, the following will describe, with reference to FIG. 11, a configuration of the main display device 210 included in the multi display system 2 of the present embodiment. Note that each of the display devices 200b through 200d has an identical configuration to that of each of the display devices 200a through 200d shown in FIG. 3. Therefore, the configuration of each of the display devices 200b through 200d is not explained herein.

[Configuration of Main Display Device]

FIG. 11 is a block diagram illustrating a configuration of a main part of the main display device 210 of the present embodiment. The main display device 210 has both of (i) the function of the display control device 100 of the previously-described embodiment and (ii) the function of the display device 200 of the previously-described embodiment. Accordingly, the reference sings of the constituent elements shown in FIG. 11 correspond to those shown in FIG. 1 or 3, and the same reference signs indicate the same constituent elements. Therefore, explanations of the constituent elements already explained in the previously-described embodiment are omitted here in order to avoid redundancy.

As shown in FIG. 11, the main display device 210 includes a main control section 70, a communication section 50, a storage section 80, a display section 51, a temperature measuring section 52, and a luminance changing section 53.

The main control section 70 centrally controls sections included in the main display device 210, and includes, as functional blocks, at least a status obtaining section 11, a condition determining section 12, a display control processing section 13, a control adjusting section 14, and a status monitoring section 43. Of these, the status obtaining section 11, the condition determining section 12, the display control processing section 13, and the control adjusting section 14 serve as the display control device 100. Each of the above functional blocks included in the main control section 70 can be achieved in such a manner that a CPU (central processing unit) retrieves a program stored in a storage device (not illustrated) made of, e.g., a ROM (read only memory), loads the program to a RAM (random access memory) or the like (not illustrated), and executes the program therein.

Further, the main control section 70 may include a command selecting section 41 (not illustrated) and a command executing section 42 (not illustrated) in order to deal with a command transmitted from the control device 99.

Consequently, the main control section 70 can serve as the display control device 100 in order to execute the luminance control function with respect to the main display device 210 and the display devices 200, or can serve as a display device in order to execute the temperature monitoring function, the luminance changing function, and the command processing function. A difference between the display control device 100 of the main display device 210 shown in FIG. 11 and the display control device 100 shown in FIG. 1 is that the control adjusting section 14 is additionally provided in the main control section 70. Functions of the control adjusting section 14 will be described in detail later.

As well as a communication section 50 included in another display device 200, the communication section 50 communicates with an upstream device and/or a downstream device connected with the main display device 210, so as to transmit/receive a message to/from the upstream device and/or the downstream device. In the case of the main display device 210, as shown in FIG. 11, the upstream device is the control device 99, and the downstream device is the display device 200b.

In the present embodiment, the communication section 50 also transmits a command generated by the main display device 210 (display control device 100) to a display device 200 which is provided downstream of the main display device 210.

The storage section 80 stores various kinds of data that the main control section 70 reads out when various kinds of functions of the main display device 210 are executed. The storage section 80 is made of, e.g., a rewritable involatile storage device.

Particularly, the storage section 80 stores various kinds of programs and various kinds of data that are read out in order to realize the luminance control function, the temperature monitoring function, and the luminance changing function, each of which is executed by the main display device 210. Concretely, the storage section 80 includes at least a system information storage section 31, an ordinary luminance storage section 32, a current status storage section 33, a previous status storage section 34, and a normal temperature range storage section 63. The system information storage section 31 stores system information related to the multi display system 2. The ordinary luminance storage section 32, which is made of a memory Kn, stores luminance setting values for an ordinary status which luminance setting values are of the main display device 210 and the display devices 200. The current status storage section 33, which is made of a memory Bn, stores current statuses of the main display device 210 and the display devices 200. The previous status storage section 34, which is made of a memory An, stores previous statuses of the main display device 210 and the display devices 200. The normal temperature range storage section 63 stores a normal temperature range indicative of a temperature range in which the main display device 210 operates normally.

The system information storage section 31 may store, in addition to information about the display devices 200, various kinds of information related to the control device 99.

(Function of Each Section of Main Control Section)

The status obtaining section 11 transmits status information obtaining commands to the display devices 200, so as to obtain, from the display devices 200b through 200d, pieces of status information of the respective display devices 200b through 200d. Further, the status obtaining section 11 instructs the status monitoring section 43 of the main display device 210 to execute the status monitoring process so as to obtain a piece of status information of the main display device 210.

According to the pieces of current status information thus obtained, the condition determining section 12 determines whether or not a temperature abnormality occurs in any of the display devices 200 and the main display device 210, each of which belongs to the multi display system 2. Then, according to the condition thus determined, the condition determining section 12 determines whether or not it is necessary to carry out a control process related to the luminance control function (the above-described temperature abnormality control process and temperature abnormality control canceling process), which control process is to be executed by the display control processing section 13.

The display control processing section 13 executes the temperature abnormality control process and the temperature abnormality control canceling process. The display control processing section 13 generates, for the respective display devices 200b through 200d belonging to the multi display system 2, luminance change commands for instructing the display devices 200b through 200d to carry out display operations according to a designated luminance setting value. Further, the display control processing section 13 transmits the luminance change commands to the display devices. Furthermore, the display control processing section 13 sets, to the designated luminance setting value, a current luminance setting value stored in the current status storage section 33 of the main display device 210, so as to control the luminance changing section 53 of the main display device 210 in order that the luminance changing function is carried out as well as in the other display devices.

The control adjusting section 14 monitors a process execution status of the main display device 210. Then, according to the process execution status of the main display device 210, the control adjusting section 14 obtains, from the upstream device, an authority to generate and transmit a command and to carry out a control when necessary. Concretely, when the main display device 210 checks for a temperature abnormality and deals with the temperature abnormality which is occurred (luminance control function), the control adjusting section 14 obtains the authority to generate and transmit a command and to carry out control instead of the control device 99 only while the main display device 210 is checking for and dealing with the temperature abnormality. Namely, during the time in which the control adjusting section 14 holds the authority, the control adjusting section 14 blocks a command from the control device 99 so that the command is not transmitted to the downstream device, and permits each section of the main display device 210 to transmit a command to the downstream device. Upon completion of the check for the abnormality and a series of steps for dealing with the abnormality, the control adjusting section 14 cancels the block against a command from the upstream device.

[Flow of Process of Main Display Device]

FIG. 12 is a flow chart illustrating a flow of a process carried out by the main display device 210 according to the present embodiment of the present invention. The main display device 210 executes a series of steps below so as to realize the luminance control function.

If the status obtaining section 11 of the main display device 210 determines that it is a time to obtain status information (YES in S301), the control adjusting section 14 first obtains the control authority, and sets the main display device 210 to a mode for ignoring a command from the control device 99 (S302).

Next, the status obtaining section 11 transmits status information obtaining commands to the respective display devices 200b through 200d via the communication section 50 (S303).

When the communication section 50 receives, from the display devices 200b through 200d, pieces of status information as responses, the status obtaining section 11 stores the pieces of status information in the current status storage section 33. Concretely, the status obtaining section 11 correspondingly associates (i) current temperature status flags and current luminance setting values included in the pieces of status information with (ii) display device IDs of the display devices which are the transmission source. Then, the status obtaining section 11 stores, in the current status storage section 33, the current temperature status flags and the current luminance setting values thus associated with the display device IDs, individually for the display devices 200 (S304).

The status obtaining section 11 determines whether or not the pieces of status information of all the display devices 200b through 200d, which are provided on the downstream side in the multi display system 2, have been stored in the current status storage section 33 (S305). If the status obtaining section 11 determines that there is status information which is not stored yet (NO in S305), the status obtaining section 11 goes back to S303 so as to attempt again to obtain, from a display device which has the status information not stored in the current status storage section 33 yet, the status information.

If the status obtaining section 11 determines that the pieces of status information of all the display devices 200b through 200d have been stored (YES in S305), the status obtaining section 11 instructs the status monitoring section 43 of the main display device 210 to execute the status monitoring process. The status obtaining section 11 associates (i) current status information of the main display device 210 obtained by the status monitoring process with (ii) ID of the main display device 210, and stores, in the current status storage section 33, the current status information associated with ID (S306). A flow of the status monitoring process carried out by the status monitoring section 43 is the same as the flow already described with reference to FIG. 8.

Next, the condition determining section 12 reads out temperature status flags of all of the display devices, i.e., all of the main display device 210 and the display devices 200b through 200d, which temperature status flags are stored in the current status storage section 33 (S307).

According to the current temperature status flags of all the display devices thus read out, the condition determining section 12 determines whether or not there exists, of the display devices including the main display device 210, a display device in which a temperature abnormality occurs (S308).

If the condition determining section 12 determines that there exists a display device in which a temperature abnormality occurs (YES in S308), the condition determining section 12 then reads out previous temperature status flags stored in the previous status storage section 34 (S309). The condition determining section 12 checks a previous temperature status flag of the display device which has been determined in S308 as having the temperature abnormality, so as to determine whether or not the temperature abnormality detected in S308 is one which occurred before this time and is lasting since then (S310).

If the condition determining section 12 determines that a status detected the last time was normal and the temperature abnormality detected in S308 is new one occurred this time (NO in S310), the condition determining section 12 determines that it is necessary to take a measure against the temperature abnormality, and instructs the display control processing section 13 to execute the temperature abnormality control process. According to this instruction, the display control processing section 13 carries out the temperature abnormality control process (S311). Note that a flow of the temperature abnormality control process carried out by the display control processing section 13 is the same as the flow already described with reference to FIG. 5. On the other hand, if the condition determining section 12 determines that the status detected the last time was also abnormal and the abnormality detected this time is one which occurred before this time and is lasting since then (YES in S310), the condition determining section 12 determines that the temperature abnormality control process which has been carried out so far should be continued, and does not transmit any new instruction to the display control processing section 13. In this case, the display control processing section 13 continues to carry out the temperature abnormality control process.

When a series of the above steps is ended, the status obtaining section 11 causes (1) the current status information obtained and stored in S304 and (ii) the current status information of the main display device 210 obtained in S306 to be stored in the previous status storage section 34 as previous status information (S312). Thereafter, the status obtaining section 11 initializes the current status storage section 33 (S313) so as to prepare for the next timing for obtaining status information. Lastly, the control adjusting section 14 cancels the mode for ignoring the command which is set in S302, and returns the control authority to the control device 99 (S314).

Alternatively, if the condition determining section 12 determines that there is no device in which a temperature abnormality occurs (NO in S308), the condition determining section 12 then reads out the previous temperature status flags stored in the previous status storage section 34 (S315). The condition determining section 12 determines, according to the previous temperature status flags of all the display devices, whether or not there is a display device in which a temperature abnormality occurred the last time, so as to determine whether or not the normal status detected in S308 is one which occurred before this time and is lasting since the last time (S316).

If the condition determining section 12 determines that a temperature abnormality occurred the last time and the normal status detected in S308 is new one achieved as a result of eliminating the temperature abnormality (YES in S316), the condition determining section 12 determines that it is necessary to cancel the measure against the temperature abnormality which has been carried out so far, and instructs the display control processing section 13 to execute a temperature abnormality control canceling process. According to this instruction, the display control processing section 13 carries out the temperature abnormality control canceling process (S317). A flow of the temperature abnormality control canceling process carried out by the display control processing section 13 is the same as the flow already described with reference to FIG. 6. On the other hand, if the condition determining section 12 determines that the status detected the last time was also normal and the normal status detected this time is one which occurred before this time and is lasting since then (NO in S316), the condition determining section 12 determines that the current status should be maintained and does not transmit any instruction to the display control processing section 13. In this case, the luminance levels of the display devices 200 are maintained according to the luminance setting values currently designated with respect to the display devices 200.

When a series of the above steps is ended, the status obtaining section 11 causes (i) the current status information obtained and stored in S304 and (ii) the current status information of the main display device 210 obtained in S306 (S312) to be stored in the previous status storage section 34 as previous status information. Thereafter, the status obtaining section 11 initializes the current status storage section 33 (S313) so as to prepare for the next timing for obtaining status information. Lastly, the control adjusting section 14 cancels the mode for ignoring the command which is set in S302, and returns the control authority to the control device 99 (S314). Then, the main control section 70 returns to S301.

[Modification]

In the above-described embodiments, the display control processing section 13 of the display control device 100 is configured to select, when a temperature abnormality occurs, a current luminance setting value obtained from a display device which is dealing with a temperature abnormality, and to set the current luminance setting value as the standard luminance setting value.

However, a configuration of a display control device 100 of the present invention is not limited to the above. Alternatively, for example, the display control device 100 may be configured to monitor luminance setting values of respective display devices independently of the presence or absence of a temperature abnormality, and to control, when a variation occurs between the luminance setting values, the display devices which are provided downstream of the display control device 100 so that their luminance setting values set to a single standard luminance setting value.

In this case, the display control processing section 13 checks the luminance setting values of the respective display devices which are obtained by the status obtaining section 11 at regular intervals, and determines a single standard luminance setting value based on all the luminance setting values. For example, the display control processing section 13 may find an average of all the luminance setting values and determine the average as the standard luminance setting value. Alternatively, the display control processing section 13 may select, as the standard luminance setting value, a luminance setting value which is the closest to the average of all the luminance setting values. Further alternatively, the display control processing section 13 may select, as the standard luminance setting value, a lowest luminance setting value of all the luminance setting values. Still further alternatively, the display control processing section 13 may select, as the standard luminance setting value, a highest luminance setting value of all the luminance setting values.

The display control processing section 13 generates luminance change commands including the standard luminance setting value thus determined, and transmits the luminance change commands to all the display devices included in the multi display system.

According to the above configuration, even in a case where the display devices are configured to individually control their luminance levels according to a change in the surroundings independently of the presence or absence of a temperature abnormality, it is possible to set luminance levels of all the display devices in the entire multi display system to be the same, thereby preventing a variation between the luminance levels of the display devices. As a result, it is possible to prevent an impairment of visibility of the entire multi display system.

Note that the display control processing section 13 may be configured (i) to check luminance setting values of the respective display devices which are obtained by the status obtaining section 11 so as to determine whether the luminance setting values are identical to each other or have a variation therebetween and (ii) to set, only when the display control processing section 13 determines that the luminance setting values have a variation therebetween, the luminance setting values to a single standard luminance setting value. Here, the determination of whether the luminance setting values are identical to each other or have a variation therebetween may be made as follows: The luminance setting values are determined to be identical only in a case where all of the luminance setting values are completely identical to each other, and, in cases other than this, the luminance setting values are determined to have a "variation". Alternatively, the luminance setting values may be determined to be identical if the luminance setting values are almost identical to each other while allowing some degree of variation. In this case, an allowable degree of variation may be set in advance as a threshold value.

Furthermore, the display control device 100 may determine the standard luminance setting value according to the following arrangement: The status obtaining section 11 may obtain, as the temperature information, numerical values (**° C.) indicative of actual temperatures of the respective display devices 200 from the display devices 200, instead of the temperature status flags. In this case, the status obtaining section 11 obtains, as the status information, (i) luminance setting values and (ii) the numerical values indicative of the temperatures (temperature information) from the display devices 200.

Then, the display control processing section 13 checks the luminance setting values of the respective display devices which are obtained by the status obtaining section 11 at regular intervals, so as to determine whether or not a variation exists between luminance levels. If the display control processing section 13 detects a variation between the luminance levels, the display control processing section 13 checks the pieces of temperature information of the respective display devices which are also obtained, so as to identify a display device having a highest temperature. Then, the display control processing section 13 determines, as a single standard luminance setting value to which the luminance setting values of all display devices are to be set, the luminance setting value of the display device thus identified as having the highest temperature.

According to the above configuration, in a case where the display devices are each configured to reduce, according to its own temperature, its luminance setting value as its temperature becomes higher, a display device having a highest temperature is considered to have a lowest luminance setting value. In view of this, the display control processing section 13 determines, as the standard luminance setting value, the lowest luminance setting value of the display device having the highest temperature. Consequently, each of the display devices controls its luminance level according to the lowest luminance setting value that the display device having the highest temperature has set in order to reduce the temperature. As a result, it is possible to eliminate a variation between the luminance levels of the plurality of display devices, and to prevent occurrence of a temperature abnormality which is caused by increases of the temperatures of the respective display devices.

The present invention is not limited to the description of the embodiments above, but may be altered by a skilled person within the scope of the claims. An embodiment based on a proper combination of technical means disclosed in different embodiments is encompassed in the technical scope of the present invention.

Lastly, the blocks of the display control device 100, the display device 200, and the main display device 210, particularly, the status obtaining section 11, the condition determining section 12, the display control processing section 13, the control adjusting section 14, the command selecting section 41, the command executing section 42, and the status monitoring section 43 may be realized by way of hardware or software as executed by a CPU as follows:

The display control device 100, the display device 200, and the main display device 210 each include a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the display control device 100, the display device 200, and the main display device 210 a computer-readable storage medium containing control program code (executable program, intermediate code program, or source program) for the display control device 100, the display device 200, and the main display device 210, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a Floppy® disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The display control device 100, the display device 200, and the main display device 210 may be configured to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (Registered Trademark), 802.11 wireless, HDR, mobile telephone network satellite line, or terrestrial digital network. The present invention encompasses a carrier wave or data signal transmission in which the program code is embodied electronically.

According to a display control device of the present invention, in a case where there exits a plurality of display devices each of which controls its luminance level according an internal temperature and/or an outside temperature of the display device, even if a temperature abnormality occurs in part of the display devices, it is possible to control the luminance levels of all the display devices according to a luminance setting value which is common to all the display devices. Therefore, the display control device of the present invention is suitably applicable to control of a multi display system including a plurality of display devices.

This provides an effect of making it possible to carry out, in a multi display system, a luminance control according to a change in the surroundings without impairing visibility of the multi display.

The luminance control section may select, as the standard luminance setting value, a lowest luminance setting value of the luminance setting values obtained from the plurality of display devices.

According to the above configuration, even in a case where only part of the plurality of display devices in the multi display system carries out a display with a luminance level reduced due to various reasons, the luminance control section controls the other display devices to set their luminance setting values to the low luminance setting value.

Therefore, even in a case where a variation occurs between the luminance levels of the display devices due to the low luminance setting value of the part of the display devices, it is possible to set the luminance levels of all the display devices to be identical by setting the low luminance setting value as the standard luminance setting value. Consequently, it is possible to prevent a variation between the luminance levels of the display devices, thereby making is possible to carry out a luminance control according to a change in the surroundings without impairing visibility of the multi display.

In a case where the plurality of display devices have pieces of temperature information, respectively, the pieces of temperature information indicating temperature statuses of the respective plurality of display devices; and the luminance setting values of the respective plurality of display devices are determined according to their corresponding pieces of temperature information, it is possible to carry out a luminance control according to a temperature change. Therefore, in such a case, the present invention provides a particularly great effect.

Concretely, in a case where the multi display system is configured such that each of the display devices adjusts its luminance setting value according to its temperature, a variation between the luminance levels becomes even greater according to a temperature change.

However, according to the configuration of the display control device of the present invention, the standard luminance setting value (e.g., a lowest luminance setting value) is determined according to the luminance setting values of the respective display devices, and the luminance setting values of the respective display devices are all set to the standard luminance setting value. This makes it possible to carry out a luminance control according to a temperature change without impairing visibility.

Preferably, the display control device further includes a condition determining section for determining, according to the pieces of temperature information of the respective plurality of display devices, whether or not a temperature abnormality occurs in at least one of the plurality of display devices, the pieces of temperature information and the luminance setting values of the respective plurality of display devices being obtained from the plurality of display devices by the status obtaining section, and if the condition determining section determines that a temperature abnormality occurs in at least one of the plurality of display devices, the luminance control section selecting, as the standard luminance setting value, a luminance setting value obtained from said at least one display device which is dealing with the temperature abnormality occurred.

According to the above configuration, the status obtaining section obtains the pieces of temperature information and the luminance setting values of the respective display devices. Then, the condition determining section checks the pieces of temperature information of the respective display devices, so as to determine whether or not a temperature abnormality occurs in any of the display devices included in the multi display system.

Further, the luminance control section controls all the display devices so as to change their luminance setting values to the luminance setting value of the display device which is dealing with the temperature abnormality.

If a temperature abnormality occurs in any of the display devices, as described above, said any of the display devices is ought to control its luminance level by adjusting its luminance setting value in order to eliminate the temperature abnormality. Therefore, it is highly possible that the luminance setting value of the display device which is dealing with the temperature abnormality is greatly different from the luminance setting values of the other normal display devices. If no measure is taken against this situation, a variation would occur between the luminance levels of the display devices in the multi display system, thereby impairing visibility.

In order to avoid this, if it is determined, according to the pieces of temperature information of the respective display devices, a temperature abnormality occurs in any of the display devices, the luminance control section selects, as the standard luminance setting value, the luminance setting value of the display device in which the temperature abnormality occurs, and controls all the display devices so that their luminance setting values become identical to each other.

Consequently, if a temperature abnormality occurs, the display device which is dealing with the abnormality and the other display devices can carry out the same luminance control.

This prevents a variation between the luminance levels of the display devices, thereby making it possible to carry out a luminance control according to a change in the surroundings without impairing visibility of the multi display.

In addition, in a multi display system, display devices are often disposed so that the display devices are closely adjacent to each other. Therefore, in a case where only a display device having an abnormality takes a measure against the abnormality and a display device which does not take any measure against the abnormality exits in the surrounding of the display device having the abnormality, it might be difficult to eliminate the temperature abnormality due to an effect of the temperature of the display device which does not take any measure against the abnormality.

However, according to the display control device of the present invention, a normal display device also carries out the same luminance control as that of a display device which is dealing with an abnormality. This also provides an effect of making it possible to eliminate a temperature abnormality more easily.

Preferably, the display control device further includes an ordinary luminance storage section for storing ordinary luminance setting values, the ordinary luminance setting values being luminance setting values which are stored in the ordinary luminance storage section if the condition determining section determines that a temperature abnormality occurs in at least one of the plurality of display devices, the luminance setting values having been obtained by the status obtaining section from the respective plurality of display devices before the occurrence of the temperature abnormality.

This makes it possible to store the luminance setting values observed in a normal status which is just before the occurrence of the temperature abnormality.

Preferably, the luminance control section changes, if the condition determining section determines that the temperature abnormality has been eliminated, the luminance setting values of the respective plurality of display devices to their corresponding ordinary luminance setting values stored in the ordinary luminance storage section.

This makes it possible to control, immediately after the temperature abnormality is eliminated, the display devices with the luminance setting values for a normal status, thereby allowing the multi display system to be quickly recovered to a normal status that the multi display system had before the occurrence of the abnormality.

The display control device of the present invention and the plurality of display devices may be connected in series via a communication section.

The display control device of the present invention may be provided in one of the plurality of display devices included in the multi display system.

Each piece of temperature information may be a temperature status flag indicative of whether a temperature of a respective one of the plurality of display devices is normal or abnormal.

In this case, if the temperature status flags of all the display devices which are obtained indicate "normal", the condition determining section determines that no temperature abnormality occurs. On the other hand, if any of the temperature status flags obtained indicates "abnormality", the condition determining section determines that a temperature abnormality occurs.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

REFERENCE SIGNS LIST

1: Multi display system
2: Multi display system
10: Main control section
11: Status obtaining section
12: Condition determining section
13: Display control processing section (luminance control section)
14: Control adjusting section
20: Communication section
30: Storage section
31: System information storage section
32: Ordinary luminance storage section
33: Current status storage section
34: Previous status storage section
40: Main control section
41: Command selecting section
42: Command executing section
43: Status monitoring section
50: Communication section
51: Display section
52: Temperature measuring section
53: Luminance changing section
60: Storage section
61: System information storage section
62: Current status storage section
63: Normal temperature range storage section
70: Main control section
80: Storage section
99: Control device
100: Display control device
200a through 200d: Display device
210: Main display device (display control device)

The invention claimed is:

1. A display control device for controlling a plurality of display devices included in a multi display system, comprising:

a status obtaining section for obtaining, from the plurality of display devices, luminance setting values and pieces of temperature information of the respective plurality of display devices, the luminance setting values defining luminance levels of the respective plurality of display devices and the pieces of temperature information indicating whether the temperature status of each of the respective plurality of display devices is (a) abnormal because the temperature of the display device has exceeded a normal temperature, (b) abnormal because the temperature of the display device has fallen below a normal temperature, or (c) normal, the luminance setting values being determined in accordance with the temperature information;

a condition determining section for determining, according to the pieces of temperature information of the respective plurality of display devices obtained by the status obtaining section, whether or not, in at least one of the display devices, an abnormal temperature condition has occurred because (a) the temperature of a display device has exceeded a normal temperature or (b) the temperature of a display device has fallen below a normal temperature; and a luminance control section for (i) determining a standard luminance setting value according to the luminance setting values obtained from the plurality of display devices and (ii) changing each of the luminance setting values of the respective display devices to the standard luminance setting value, wherein the luminance control section determines, as the standard luminance setting value, a lowest luminance setting value among the luminance setting values of the respective plurality of display devices when an abnormal condition has occurred in one of the display devices because the temperature of the display device has exceeded a normal temperature, and wherein the luminance control section determines, as the standard luminance setting value, a highest luminance setting value among the luminance setting values of the respective plurality of display devices when an abnormal condition has occurred in one of the display devices because the temperature of the display device has fallen below a normal temperature.

2. The display control device as set forth in claim 1, further comprising:

an ordinary luminance storage section for storing ordinary luminance setting values, the ordinary luminance setting values being luminance setting values which are stored in the ordinary luminance storage section if the condition determining section determines that a temperature abnormality has occurred in at least one of the plurality of display devices, the luminance setting values having been obtained by the status obtaining section from the respective plurality of display devices before the occurrence of the temperature abnormality.

3. The display control device as set forth in claim 2, wherein:

the luminance control section changes, if the condition determining section determines that the temperature abnormality has been eliminated, the luminance setting values of the respective plurality of display devices to their corresponding ordinary luminance setting values stored in the ordinary luminance storage section.

4. The display control device as set forth in claim 1, wherein:
the display control device and the plurality of display devices are connected in series via a communication section.

5. The display control device as set forth in claim 1, wherein:
the display control device is provided in one of the plurality of display devices included in the multi display system.

6. The display control device as set forth in claim 1, wherein:
each piece of temperature information is a temperature status flag indicative of whether a temperature of a respective one of the plurality of display devices is normal or abnormal.

7. The display control device as set forth in claim 1, wherein:
the status obtaining section obtains, from the plurality of display devices, the pieces of temperature information and the luminance setting values of the respective plurality of display devices, each piece of temperature information indicating a numerical value of a temperature of a respective one of the plurality of display devices; and
the luminance control section identifies, according to the pieces of temperature information of the respective plurality of display devices obtained by the status obtaining section, a display device having a highest temperature, and selects, as the standard luminance setting value, a luminance setting value obtained from the display device thus identified.

8. A display control method for controlling a plurality of display devices included in a multi display system, comprising the steps of:
(i) obtaining, from the plurality of display devices, luminance setting values of the respective plurality of display devices, the luminance setting values defining luminance levels of the respective plurality of display devices, and pieces of temperature information indicating whether a status of each of the respective plurality of display devices is (a) abnormal because the temperature of the display device has exceeded a normal temperature, (b) abnormal because the temperature of the display device has fallen below a normal temperature, or (c) normal, the luminance setting values being determined in accordance with the temperature information;
(ii) determining, according to the temperature information of the respective plurality of display devices obtained in step (i), whether or not, in at least one of the display devices, an abnormal temperature condition has occurred because (a) the temperature of the display device has exceeded a normal temperature or (b) the temperature of the display device has fallen below a normal temperature; and
(iii) controlling the luminance levels in such a manner that a standard luminance setting value is determined according to the luminance setting values obtained from the plurality of display devices in the step (i), and each of the luminance setting values of the respective plurality of display devices is changed to the standard luminance setting value;
wherein in step (iii) the lowest luminance setting value among the luminance setting values of the respective plurality of display devices is determined as the standard luminance setting value when an abnormal condition is determined to have occurred in one of the display devices because the temperature of the display device has exceeded a normal temperature, and
wherein in step (iii) the highest luminance setting value among the luminance setting values of the respective plurality of display devices is determined as the standard luminance setting value when an abnormal condition has occurred in one of the display devices because the temperature of the display device has fallen below a normal temperature.

9. A non-transitory computer-readable storage medium storing a control program of a display control device, the display control device controlling a plurality of display devices included in a multi display system, the control program causing a computer to execute the steps of:
(i) obtaining, from the plurality of display devices, luminance setting values of the respective plurality of display devices, the luminance setting values defining luminance levels of the respective plurality of display devices, and pieces of temperature information indicating whether a status of each of the respective plurality of display devices is (a) abnormal because the temperature of the display device has exceeded a normal temperature, (b) abnormal because the temperature of the display device has fallen below a normal temperature, or (c) normal, the luminance setting values being determined in accordance with the temperature information;
(ii) determining, according to the temperature information of the respective plurality of display devices obtained in step (i), whether or not, in at least one of the display devices, an abnormal temperature condition has occurred because (a) the temperature of the display device has exceeded a normal temperature or (b) the temperature of the display device has fallen below a normal temperature; and
(iii) controlling the luminance levels in such a manner that a standard luminance setting value is determined according to the luminance setting values obtained from the plurality of display devices in the step (i), and each of the luminance setting values of the respective plurality of display devices is changed to the standard luminance setting value,
wherein in step (iii) the lowest luminance setting value among the luminance setting values of the respective plurality of display devices is determined as the standard luminance setting value when an abnormal condition is determined to have occurred in one of the display devices because the temperature of the display device has exceeded a normal temperature, and
wherein in step (iii) the highest luminance setting value among the luminance setting values of the respective plurality of display devices is determined as the standard luminance setting value when an abnormal condition has occurred in one of the display devices because the temperature of the display device has fallen below a normal temperature.

* * * * *